United States Patent
Huang

(10) Patent No.: US 10,433,323 B2
(45) Date of Patent: Oct. 1, 2019

(54) COMMUNICATION CONTROL STATION DEVICE, COMMUNICATION TERMINAL DEVICE, AND COMMUNICATION CONTROL METHOD

(71) Applicant: Panasonic Corporation, Osaka (JP)

(72) Inventor: Lei Huang, Singapore (SG)

(73) Assignee: Panasonic Corporation, Osaka (JP)

( * ) Notice: Subject to any disclaimer, the term of this patent is extended or adjusted under 35 U.S.C. 154(b) by 263 days.

(21) Appl. No.: 14/727,902

(22) Filed: Jun. 2, 2015

(65) Prior Publication Data
US 2015/0365156 A1    Dec. 17, 2015

(30) Foreign Application Priority Data
Jun. 13, 2014  (JP) ................................. 2014-122725

(51) Int. Cl.
*H04W 72/12*   (2009.01)
*H04W 4/80*    (2018.01)

(52) U.S. Cl.
CPC .......... *H04W 72/1231* (2013.01); *H04W 4/80* (2018.02); *Y02D 70/00* (2018.01); *Y02D 70/142* (2018.01)

(58) Field of Classification Search
CPC .......... H04W 72/1205; H04W 72/121; H04W 72/1231; H04W 72/1236; H04W 72/1226
See application file for complete search history.

(56) References Cited

U.S. PATENT DOCUMENTS

| | | | | |
|---|---|---|---|---|
| 2002/0116460 A1* | 8/2002 | Treister | ................. | H04W 84/20 709/204 |
| 2007/0121545 A1* | 5/2007 | Park | ...................... | G01S 5/0205 370/329 |
| 2007/0291702 A1* | 12/2007 | Nanba | ....................... | H04J 3/00 370/336 |

(Continued)

OTHER PUBLICATIONS

"Spatial sharing and interference mitigation for DMG STAs" IEEE STD 802.11ad-2012, pp. 391-394.

*Primary Examiner* — Jeffrey M Rutkowski
*Assistant Examiner* — Andre Tacdiran
(74) *Attorney, Agent, or Firm* — Seed IP Law Group LLP

(57) ABSTRACT

A communication control station device controls whether or not spatial sharing is applied between a first communication period and a second communication period. An operation determining section determines whether a first communication operation or a second communication operation out of communication operations is executed in each of the first communication period and the second communication period. The first communication operation requires lower transmission power than the second communication operation. A message generator generates messages requesting a first group of communication terminal devices communicating in the first communication period and a second group of communication terminal devices communicating in the second communication period to perform predetermined measurement in accordance with the determined communication operations. A scheduler allocates a schedule of the spatial sharing on the basis of results of measurement by the first group of communication terminal devices or the second group of communication terminal devices.

3 Claims, 19 Drawing Sheets

(56) References Cited

U.S. PATENT DOCUMENTS

| | | | |
|---|---|---|---|
| 2010/0067433 A1* | 3/2010 | Cheng | H04W 24/10 370/320 |
| 2010/0099449 A1* | 4/2010 | Borran | H04W 52/243 455/501 |
| 2012/0170557 A1* | 7/2012 | Tsfati | H04W 72/1215 370/338 |
| 2012/0182896 A1* | 7/2012 | Jang | H04W 24/10 370/252 |
| 2015/0156722 A1* | 6/2015 | Kim | H04W 74/08 370/311 |
| 2016/0037547 A1* | 2/2016 | Yang | H04W 36/0066 370/329 |
| 2016/0072569 A1* | 3/2016 | Yang | H04B 7/0617 370/329 |
| 2016/0081039 A1* | 3/2016 | Lindoff | H04W 52/383 455/450 |
| 2016/0316375 A1* | 10/2016 | Li | H04W 72/1226 |
| 2016/0316484 A1* | 10/2016 | Feng | H04L 1/00 |

* cited by examiner

PRIOR ART

PRIOR ART

COMMUNICATION CONTROL STATION DEVICE, COMMUNICATION TERMINAL DEVICE, AND COMMUNICATION CONTROL METHOD

BACKGROUND

1. Technical Field

The present disclosure relates to a communication control station device and a communication control method for controlling spatial sharing (SPSH: SPatial SHaring) of wireless communication using antenna directivity and to a communication terminal device that performs communication during a service period designated by the communication control station device.

2. Description of the Related Art

In recent years, unlicensed 60 GHz millimeter wave wireless communication networks have been drawing increased attention. WirelessHD (Registered Trademark) technology is the first 60 GHz millimeter wave industry standard, which enables multi-gigabit wireless streaming of high-definition audio, video, and data to consumer electronics, personal computers, and portable products. Another multi-gigabit wireless communications technology operating over the 60 GHz millimeter wave frequency band is WiGig (Wireless Gigabit) technology, which has been standardized by the IEEE (Institute of Electrical and Electronic Engineers) as the IEEE 802.11ad standard.

FIG. 18 is an explanatory view concerning SPSH assessment in a case where an existing SP has been allocated and a candidate SP has not been allocated according to a conventional art. In the following description, a "Service Period" (hereinafter abbreviated as a "SP") is a communication period of a pair of communication terminal devices allocated by a communication control station device. The term "SPatial SHaring" (SPSH) encompasses the concept of spatial multiplexing, i.e., two pairs of communication terminal devices perform communication concurrently over a period in which SPs partially or entirely overlap each other.

In a BI (Beacon Interval) 500 illustrated in FIG. 18, a communication period (SP) between communication terminal devices 104aZ and 104bZ has already been allocated by a communication control station device 102Z (see FIG. 9 that will be described later). Hereinafter, an already allocated communication period (SP) that is a standard in SPSH is referred to as an "existing SP". Meanwhile, an SP which is a communication period (SP) allocated during a period other than an existing SP and for which reallocation of a schedule is considered by SPSH with the existing SP or a communication period (SP) that is scheduled to be allocated after being assessed for SPSH with the existing SP is referred to as a "candidate SP".

The communication control station device 102Z instructs another pair of communication terminal devices to perform measurement during a predetermined period (Measurement Unit) from a start time of measurement (Measurement Start Time) of an existing SP 510 in order to determine whether or not communication of the other pair of communication terminal devices is applied to part of or all of the existing SP 510.

More specifically, the communication control station device 102Z determines whether or not SPSH for achieving concurrent communication of a pair of communication terminal devices 104aZ and 104bZ and a pair of communication terminal devices 104cZ and 104dZ is applied. For this purpose, the communication control station device 102Z instructs the pair of communication terminal devices 104cZ and 104dZ to perform measurement during a predetermined period (Measurement Unit) from a start time of measurement (Measurement Start Time) of the existing SP 510 reserved by the pair of communication terminal devices 104aZ and 104bZ.

FIG. 19 is an explanatory view concerning SPSH assessment in a case where an existing SP and a candidate SP have been allocated according to a conventional art. In a BI500 illustrated in FIG. 19, a communication period (SP) between the communication terminal devices 104aZ and 104bZ has already been allocated as an existing SP by the communication control station device 102Z (see FIG. 9 that will be described later), and a communication period (SP) between the communication terminal devices 104cZ and 104dZ has already been allocated as a candidate SP by the communication control station device 102Z.

As in FIG. 18, the communication control station device 102Z determines whether or not communication by the communication terminal devices 104cZ and 104dZ is allowed in part of or all of the existing SP 510, i.e., whether or not SPSH for achieving concurrent communication of the pair of communication terminal devices 104aZ and 104bZ and the pair of communication terminal devices 104cZ and 104dZ is applied. For this purpose, the communication control station device 102Z instructs the pair of communication terminal devices 104cZ and 104dZ to perform measurement during a predetermined period (Measurement Unit) from a start time of measurement (Measurement Start Time) of the reserved existing SP 510.

Furthermore, the communication control station device 102Z determines whether or not communication by the communication terminal devices 104aZ and 104bZ is applied to part of or all of the candidate SP 514, i.e., whether or not SPSH for achieving concurrent communication of the pair of communication terminal devices 104aZ and 104bZ and the pair of communication terminal devices 104cZ and 104dZ is applied. For this purpose, the communication control station device 102Z instructs the pair of communication terminal devices 104aZ and 104bZ to perform measurement during a predetermined period (Measurement Unit) from a start time of measurement (Measurement Start Time) of the candidate SP 514 reserved by the pair of communication terminal devices 104cZ and 104dZ.

IEEEStd802.11ad™-2012, December 2012, 10.31 Spatial sharing and interference mitigation for DMG STAs, P391-394 is an example of related art.

SUMMARY

The conventional art does not consider a difference in transmission power during communication between pairs of communication terminal devices. Therefore, interference of radio waves occurs between the existing SP 510 and the candidate SP 514 due to communications by the communication terminal devices. As a result, it is difficult to achieve spatial sharing (SPSH).

One non-limiting and exemplary embodiment provides a communication control station device, a communication terminal device, and a communication control method that achieves spatial sharing (SPSH) for achieving concurrent communication of different pairs of communication terminal devices even in a case where there is a difference in transmission power in communication between one communication period (SP) and the other communication period (SP).

In one general aspect, the techniques disclosed here feature a communication control station device including: an operation determining section that determines whether a first communication operation or a second communication operation out of communication operations is executed in each of a first communication period and a second communication period, the first communication operation requiring lower transmission power than the second communication operation; a message generator that generates messages requesting a first group of communication terminal devices communicating in the first communication period and a second group of communication terminal devices communicating in the second communication period to perform predetermined measurement in accordance with the determined communication operations; a scheduler that allocates a schedule of a spatial sharing on the basis of results of measurement by the first group of communication terminal devices or the second group of communication terminal devices; and a transmitter that transmits the generated messages and the schedule of the spatial sharing to the first group of communication terminal devices and the second group of communication terminal devices.

According to the present disclosure, it is possible to achieve spatial sharing (SPSH) for achieving concurrent communication of different pairs of communication terminal devices even in a case where there is a difference in transmission power in communication between one communication period (SP) and the other communication period (SP).

It should be noted that general or specific embodiments may be implemented as a system, a method, an integrated circuit, a computer program, a storage medium, or any selective combination thereof.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

DETAILED DESCRIPTION

Underlying Knowledge Forming Basis of the Present Embodiment

Figure 9:
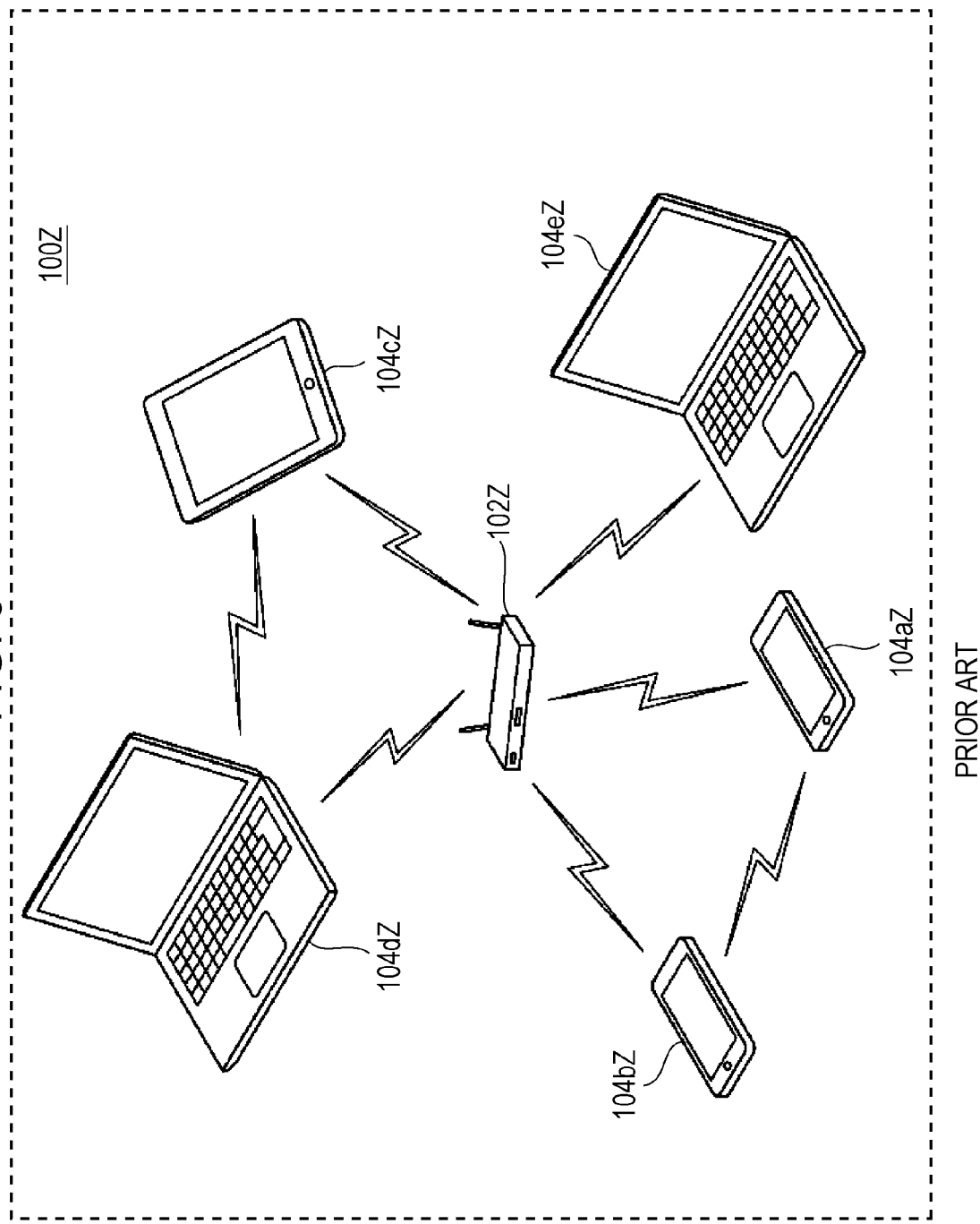
FIG. 9 illustrates an example of a system configuration of a centralized WiGig network including a communication control station device and a plurality of communication terminal devices according to a conventional art.

Before describing the contents of an embodiment (hereinafter referred to as "the present embodiment") of a communication control station device, a communication terminal device, and a communication control method according to the present disclosure, the underlying knowledge forming the basis of the present embodiment is described with reference to FIGS. 9 through 17. FIG. 9 is a system configuration diagram illustrating an example of a centralized WiGig network including a communication control station device 102Z and a plurality of communication terminal devices 104aZ, 104bZ, 104cZ, 104dZ, and 104eZ according to the conventional art.

The WiGig technology supplements and extends a MAC (Media Access Control) layer in the IEEE802.11 wireless communication standard and is compatible with WLAN (Wireless Local Area Network) in the IEEE802.11 wireless communication standard. The WiGig MAC support technology supports a centralized network architecture such as an infrastructure BSS (Basic Service Set) or a personal BSS. For example, in a centralized network architecture, a central communication control station device, e.g., AP (Access Point) or PCP (Personal BSS Control Point), transmits beacons to all communication terminal devices in the network in order to synchronize all communication terminal devices in the network.

In contrast to other IEEE 802.11 wireless communication standard technologies operating over 2.4 GHz or 5 GHz frequency band, the WiGig technology makes use of BF (Beamforming) to achieve transmissions using antenna directivity.

The centralized WiGig network 100Z illustrated in FIG. 9 includes the communication control station device 102Z and the plurality of (for example, five) communication terminal devices 104aZ, 104bZ, 104cZ, 104dZ, and 104eZ. In FIG. 9, the communication control station device 102Z has the same wireless communication function as the communication terminal devices 104aZ, 104bZ, 104cZ, 104dZ, and 104eZ. The communication control station device 102Z controls not only communication between the communication control station device 102Z and a single communication terminal device (for example, the communication terminal device 104aZ), but also direct communication between two communication terminal devices (for example, the communication terminal devices 104aZ and 104bZ).

Figure 10:
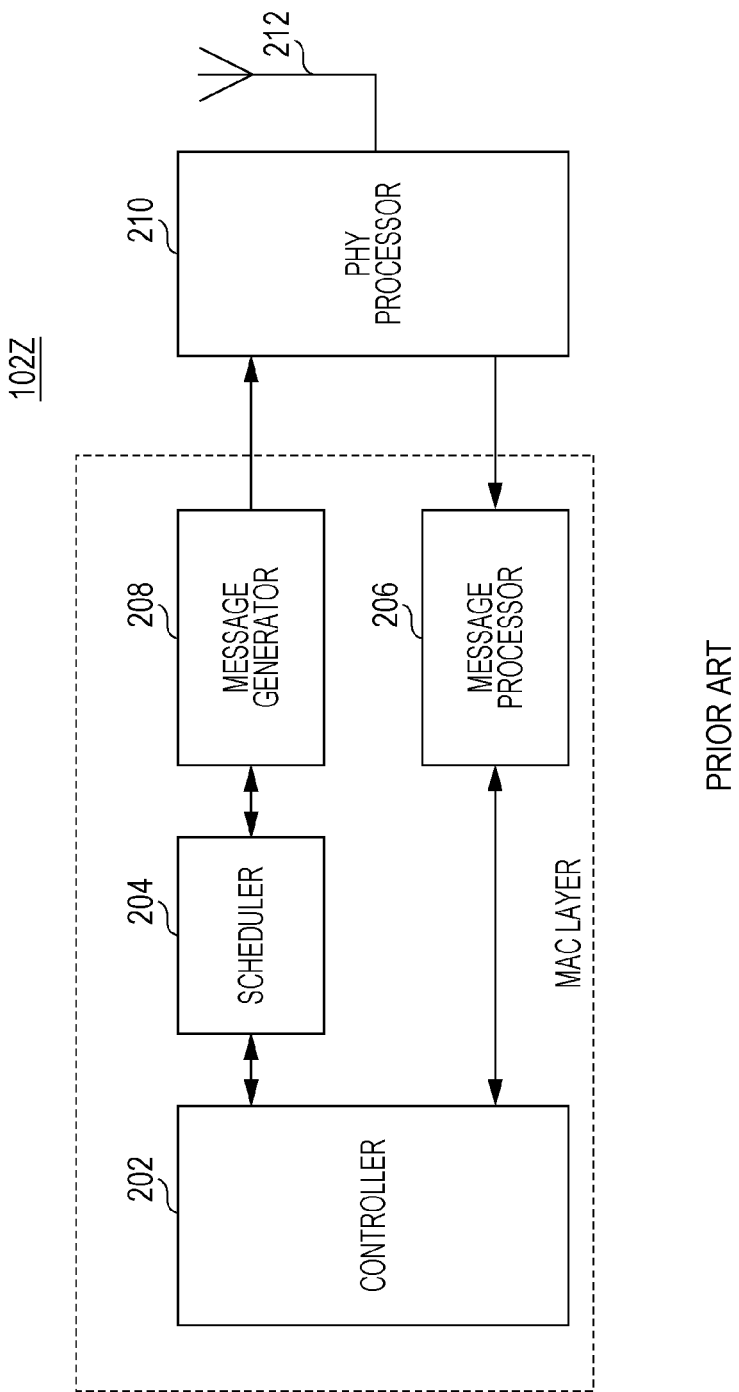
FIG. 10 illustrates an example of a functional architecture of the conventional communication control station device.

FIG. 10 is a block diagram illustrating an example of an architecture of the conventional communication control station device 102Z. The communication control station device 102Z illustrated in FIG. 10 includes a controller 202, a scheduler 204, a message processor 206, a message generator 208, a PHY (Physical) processor 210, and an antenna 212.

The controller 202 is a MAC protocol controller and controls general MAC protocol operations. The scheduler 204 schedules, for each of the communication terminal devices 104aZ, 104bZ, 104cZ, 104dZ, and 104eZ which are targets of wireless communication control, the allocation of communication periods (channel access periods) under the control of the controller 202.

The message generator 208 acquires scheduling information concerning a communication schedule allocated by the scheduler 204 and generates control information, data or management messages (for example, beacons). The management messages are transmitted through the antenna 212 after predetermined PHY (Physical Layer) processing by the PHY processor 210. The antenna 212 may be a single element antenna, an adaptive antenna array, or a switched beam antenna. On the other hand, the message processor 206 analyzes the messages received from one or more communication terminal devices and provides them to the controller 202.

Figure 11:
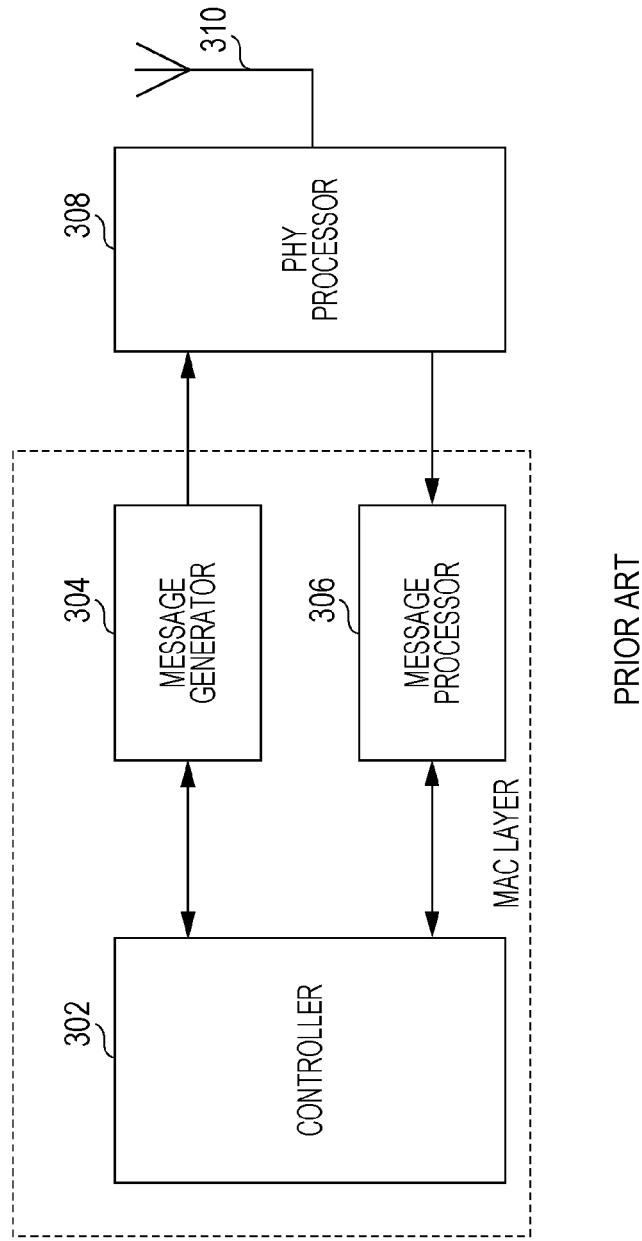
FIG. 11 illustrates an example of a functional architecture of the conventional communication terminal device.

FIG. 11 is a block diagram illustrating an example of an architecture of the conventional communication terminal devices 104aZ, 104bZ, 104cZ, 104dZ, and 104eZ. Each of the communication terminal devices 104aZ, 104bZ, 104cZ, 104dZ, and 104eZ illustrated in FIG. 11 includes a controller 302, a message generator 304, a message processor 306, a PHY processor 308, and an antenna 310.

The controller 302 is a MAC protocol controller and controls general MAC protocol operations. The message generator 304 generates at least one of control, data, and management messages under the control of the controller 302. These messages are transmitted through the antenna 310 after predetermined PHY (Physical Layer) processing by the PHY processor 308. The antenna 310 may be a single element antenna, an adaptive antenna array, or a switched beam antenna. On the other hand, the message processor 306 analyzes at least one of control, data, and management messages received from the communication control station device 102Z under the control of the controller 302 and provides them to the controller 302.

In the centralized WiGig network 100 illustrated in FIG. 9, the communication control station device 102Z generates scheduling information allocated by coordinating a communication period (SP) so that communication (channel access) by the communication terminal devices 104aZ, 104bZ, 104cZ, 104dZ, and 104eZ occurs during beacon intervals (hereinafter referred to as "BIs").

The communication control station device 102Z transmits the scheduling information to the communication terminal devices 104aZ, 104bZ, 104cZ, 104dZ, and 104eZ by using beacons. The communication terminal devices 104aZ, 104bZ, 104cZ, 104dZ, and 104eZ receive the scheduling information and perform communication in accordance with a predetermined access rule for an allocated communication period (SP) specified in the scheduling information.

Figure 12:
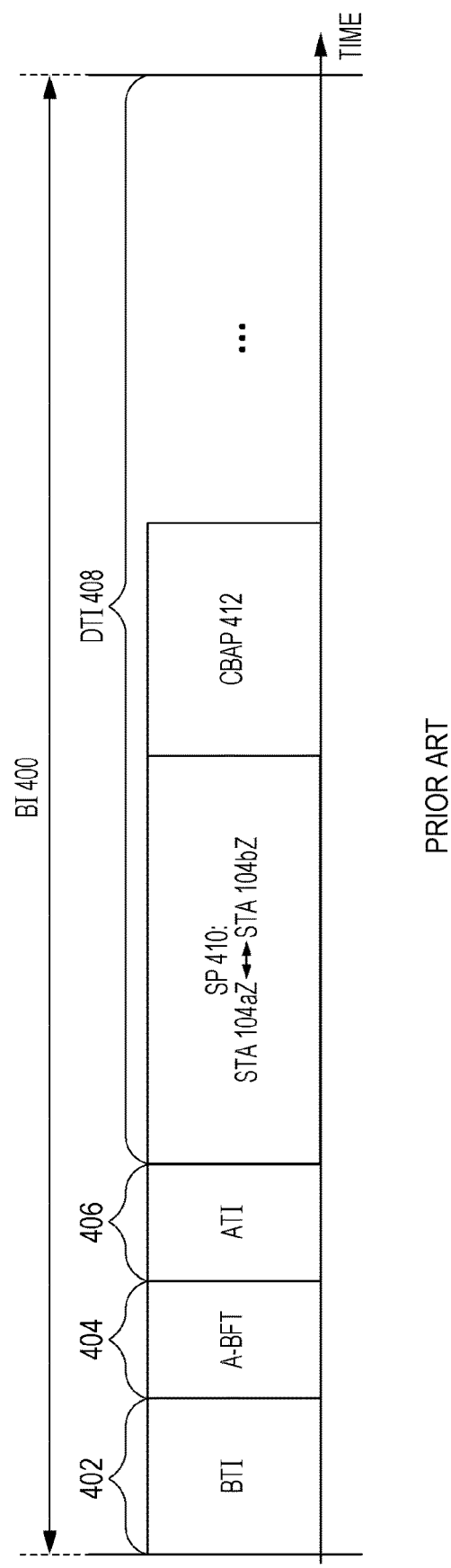
FIG. 12 illustrates details of a temporal internal structure in a conventional BI.

FIG. 12 is a view illustrating details of periods that are included in a conventional BI 400. The BI 400 includes four types of access periods: a beacon transmission interval (hereinafter referred to as "BTI") 402, an association beamforming training (hereinafter referred to as "A-BFT") period 404, an announcement transmission interval (hereinafter referred to as "ATI") 406, and a data transmission interval (hereinafter referred to as "DTI") 408.

The BTI 402 is an access period during which the communication control station device 102Z performs beamforming training with directional transmission of multiple beacons through all sectors of the antenna 212 in order to reach the full extent of transmission coverage of the communication terminal devices 104aZ, 104bZ, 104cZ, 104dZ, and 104eZ.

In the A-BFT period 404, the communication terminal devices 104aZ, 104bZ, 104cZ, 104dZ, and 104eZ may perform beamforming training with the communication control station device 102Z that transmitted the beacons during the preceding BTI 402.

The ATI 406 is a request-response-based management access period between the communication control station device 102Z and the communication terminal devices 104aZ, 104bZ, 104cZ, 104dZ, and 104eZ.

The DTI 408 is a period for communication (including message exchanges) between the communication terminal devices 104aZ, 104bZ, 104cZ, 104dZ, and 104eZ or between the communication terminal devices 104aZ, 104bZ, 104cZ, 104dZ, and 104eZ and the communication control station device 102Z. The DTI 408 further includes a plurality of access periods, e.g., a combination of a SP 410, which is a communication period, and a contention-based access period (hereinafter referred to as "CBAP") 412. The SP 410 is channel time (communication period) reserved for communications between a group of communication terminal devices (a pair of communication terminal devices (e.g., communication terminal devices 104aZ and 104bZ)).

The WiGig MAC support technology introduces a so-called SPSH (Spatial Sharing) mechanism to maximize the PBSS (Personal Basic Set Service)/infrastructure BSS performance. Because of the introduction of SPSH, communication periods (SPs) allocated to different pairs of communication terminal devices in the same spatial vicinity may be scheduled concurrently over the same channel.

A pair of communication terminal devices involved in an existing SP or a pair of communication terminal devices involved in a candidate SP perform beamforming training with each other before engaging in any other communication or before performing any measurements of a wireless environment for assessment of SPSH.

Figure 13:
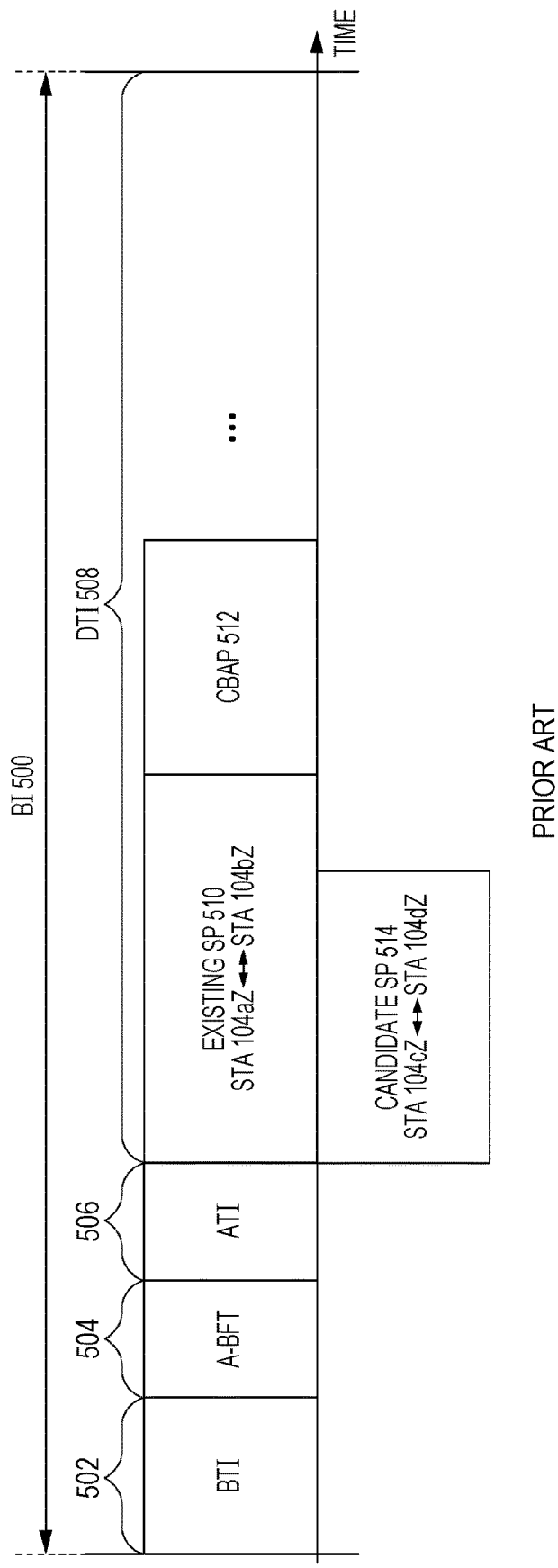
FIG. 13 illustrates spatial sharing (SPSH) between an existing SP and a candidate SP in a conventional BI.

FIG. 13 is a diagram illustrating spatial sharing (SPSH) between an existing SP 510 and a candidate SP 514 in a conventional BI 500. The BI 500 illustrated in FIG. 13 has an identical configuration to the BI 400 illustrated in FIG. 12, and therefore, description of a BTI 502, an A-BFT 504, and an ATI 506 is omitted.

The DTI 508 includes a plurality of access periods (e.g., an existing SP 510, a CBAP 512, and a candidate SP 514). The existing SP 510 is reserved, for example, for communications between the communication terminal devices 104aZ and 104bZ by the communication control station device 102Z. The candidate SP 514 is reserved, for example, for communications between the communication terminal devices 104cZ and 104dZ by the communication control station device 102Z. In FIG. 13, the candidate SP 514 is scheduled to overlap the existing SP 510 on the same channel within the BI 500.

Therefore, in the BI 500 illustrated in FIG. 13, spatial sharing (SPSH) is achieved between communication (the existing SP 510) between the communication terminal devices 104aZ and 104bZ and communication (the candidate SP 514) between the communication terminal devices 104cZ and 104dZ, and therefore, these pairs of communication terminal devices concurrently perform communication.

Figure 14:
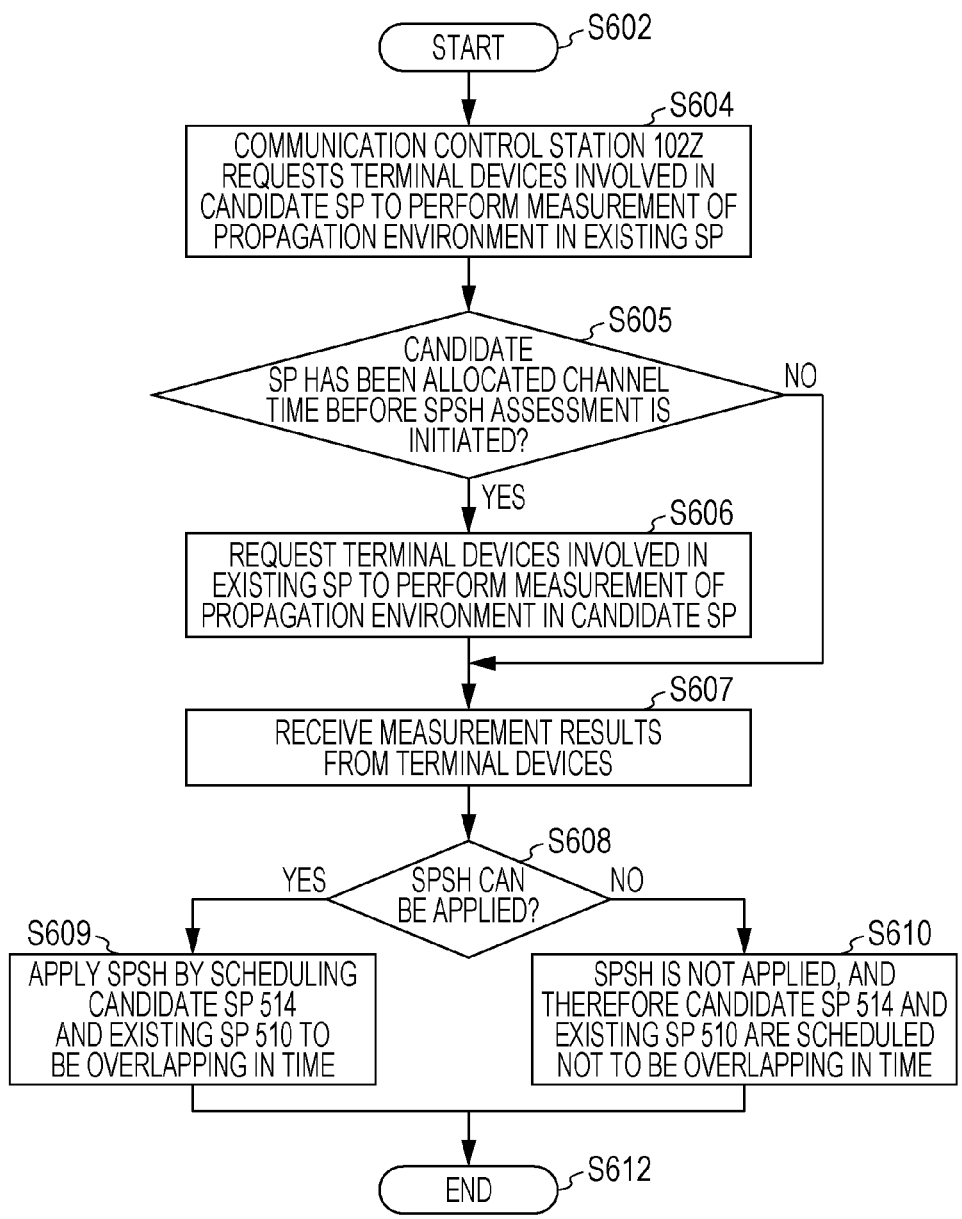
FIG. 14 illustrates a flow chart of an operation procedure for determining whether or not spatial sharing (SPSH) between the existing SP and the candidate SP is performed in the conventional communication control station device.
Figure 15:
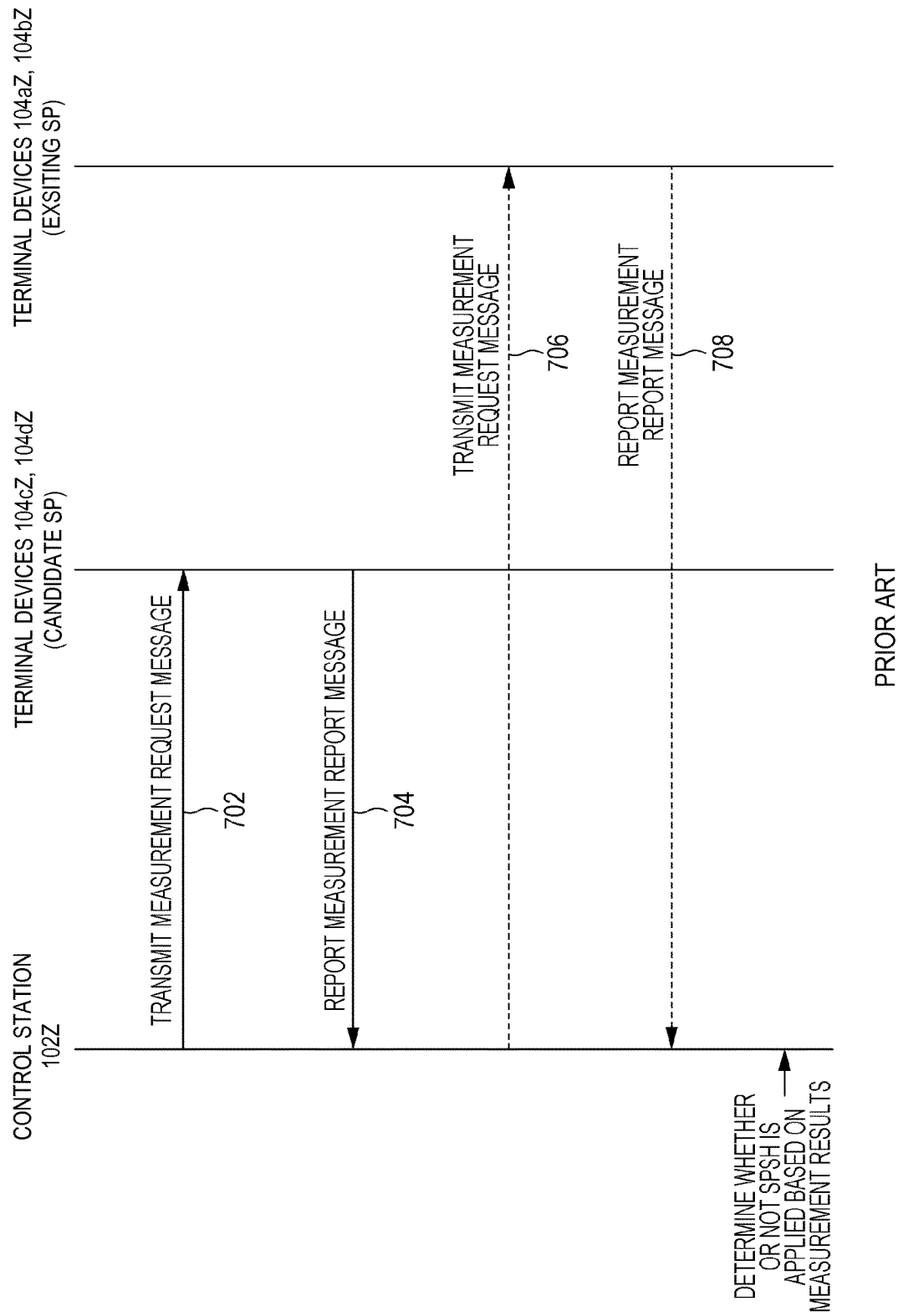
FIG. 15 illustrates a sequence of an operation procedure of signaling concerning SPSH assessment between the conventional communication control station device, the communication terminal devices involved in the existing SP, and the communication terminal devices involved in the candidate SP.

FIG. 14 is a flow chart for explaining an operational procedure for determining whether or not spatial sharing (SPSH) between the existing SP 510 and the candidate SP 514 in the conventional communication control station device 102Z is applied. FIG. 15 is a sequence diagram for explaining an operational procedure for signaling concerning SPSH assessment of the conventional communication control station device 102Z, the communication terminal devices 104aZ and 104bZ involved in the existing SP 510, and the communication terminal devices 104cZ and 104dZ involved in the candidate SP 514.

In FIG. 14, the communication control station device 102Z initiates SPSH assessment (S602). Specifically, the communication control station device 102Z transmits a measurement request message 702 to each of the communication terminal devices (i.e., the communication terminal devices 104cZ and 104dZ) involved in the candidate SP 514 to request (order) measurement of a wireless environment for the purpose of assessing the possibility for SPSH with the existing SP 510 (S604).

After receiving the measurement request message 702, each of the communication terminal devices 104cZ and 104dZ involved in the candidate SP 514 carries out measurement of the wireless environment at the start time of the existing SP 510 and reports the results of measurement to the communication control station device 102Z using a measurement report message 704. Note that the communication terminal device (e.g., the communication terminal device 104cZ) performs beamforming training with the communication terminal device 104dZ to have the same reception directivity as the determined reception directivity of the antenna 310 when receiving frames of a measurement packet from the communication terminal device (e.g., the communication terminal device 104aZ) involved in the existing SP 510.

Before the SPSH assessment is initiated, the communication control station device 102Z determines whether or not the candidate SP 514 has been allocated channel time (S605).

In a case where the candidate SP 514 has been allocated channel time (YES in S605), the communication control station device 102Z transmits a measurement request message 706 to each of the communication terminal devices (i.e., the communication terminal devices 104aZ and 104bZ) involved in the existing SP 510 to request (order) measurement of a wireless environment for the purpose of assessing the possibility for SPSH with the candidate SP 514 (S606).

In a case where the candidate SP 514 has not been allocated channel time (NO in S605), the communication control station device 102Z omits the request for measurement made to the communication terminal devices 104aZ and 104bZ involved in the existing SP 510.

After receiving the measurement request message 706 (S606), each of the communication terminal devices 104aZ and 104bZ involved in the existing SP 510 carries out measurement of the wireless environment at the start time of the candidate SP 514 and reports the results of measurement to the communication control station device 102Z using a measurement report message 708. Note that the communication terminal device (e.g., the communication terminal device 104aZ) performs beamforming training with the communication terminal device 104bZ to have the same reception directivity as the determined reception directivity of the antenna when receiving frames of a measurement packet from the communication terminal device (e.g., the communication terminal device 104cZ) involved in the candidate SP 514.

The communication control station device 102Z receives the measurement report message from each of the communication terminal devices (S607). Note that in a case of YES in Step S605, the communication control station device 102Z receives the measurement report message from the communication terminal devices 104aZ, 104bZ, 104cZ, and 104dZ, whereas in a case of NO in Step S605, the communication control station device 102Z receives the measurement report message from the communication terminal devices 104cZ and 104dZ.

The communication control station device 102Z determines whether or not SPSH between the existing SP 510 and the candidate SP 514 is allowed based on the results of measurement of the wireless environment which are carried in the measurement report messages received in Step S607 (S608).

In a case where it is determined that SPSH is allowed, the communication control station device 102Z applies SPSH by scheduling the candidate SP 514 to overlap the existing SP 510 as illustrated in FIG. 13 (S609). In a case where it is determined that SPSH is not allowed, the communication control station device 102Z does not apply SPSH, and therefore, the candidate SP 514 is scheduled not to overlap the existing SP 510 (S610). For example, the candidate SP 514 is scheduled to occur after the existing SP 510, and then the processing is finished (S612).

Figure 16:
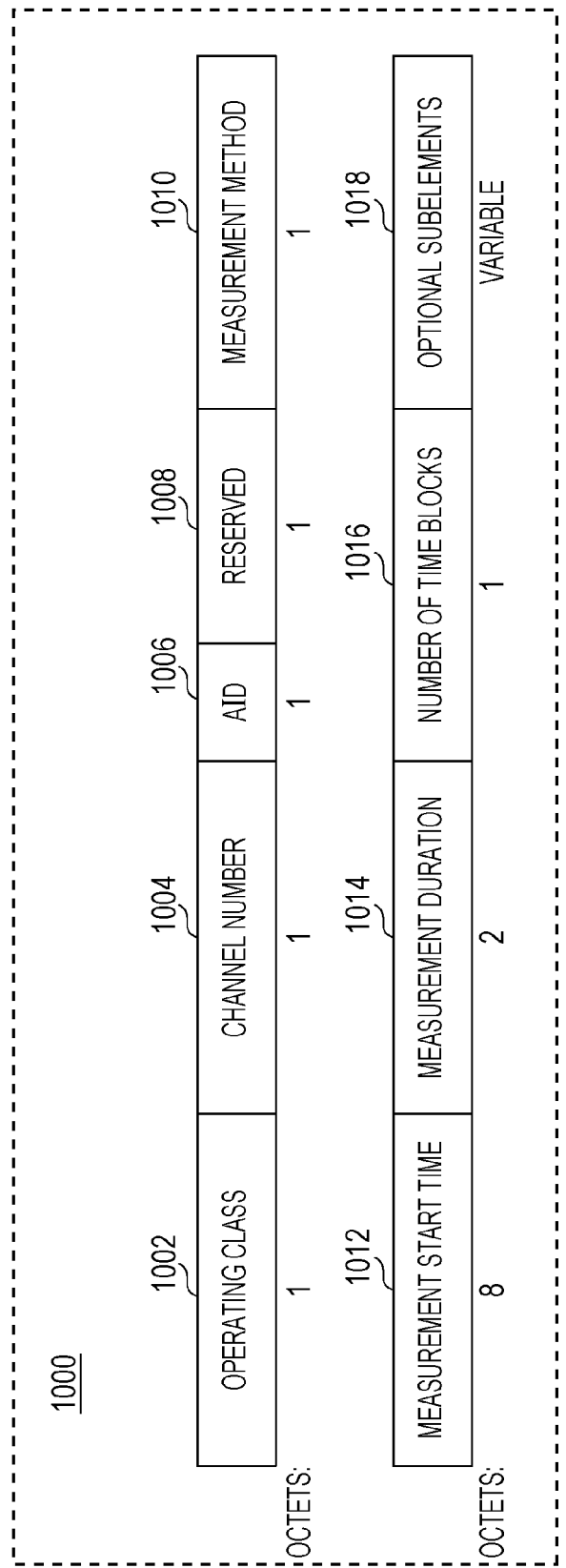
FIG. 16 illustrates an example of a format of a conventional measurement request message.

FIG. 16 is a diagram illustrating an example of a format of a conventional measurement request message 1000. The measurement request message 1000 includes an Operating Class field 1002, a Channel Number field 1004, an AID field 1006, a Reserved field 1008, a Measurement Method field 1010, a Measurement Start Time field 1012, a Measurement Duration field 1014, a Number of Time Blocks field 1016, and an Optional Subelements field 1018.

The Operating Class field 1002 and the Channel Number field 1004 respectively indicate the channel set and the channel number to which the measurement request message 1000 applies. The AID field 1006 indicates a target, i.e., a target communication terminal device. The Measurement Method field 1010 indicates the method that is to be used by the requested communication terminal device to carry out measurement of a wireless environment, which is, for example, set to ANIPI (Average Noise plus Interference Power Indicator) for the purpose of SPSH assessment.

Figure 18:
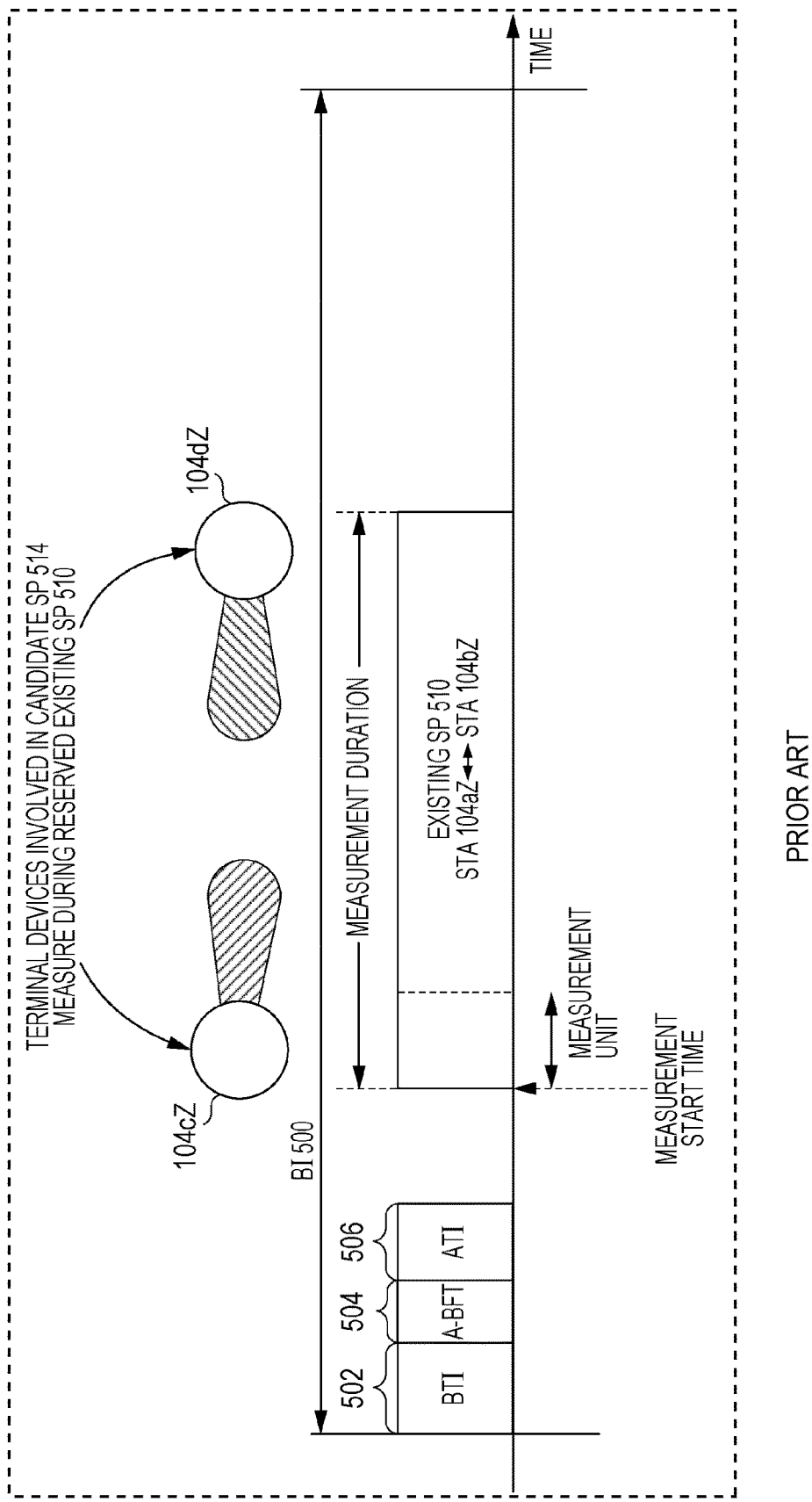
FIG. 18 explains SPSH assessment in a case where an existing SP has been allocated and a candidate SP has not been allocated according to a conventional art.
Figure 19:
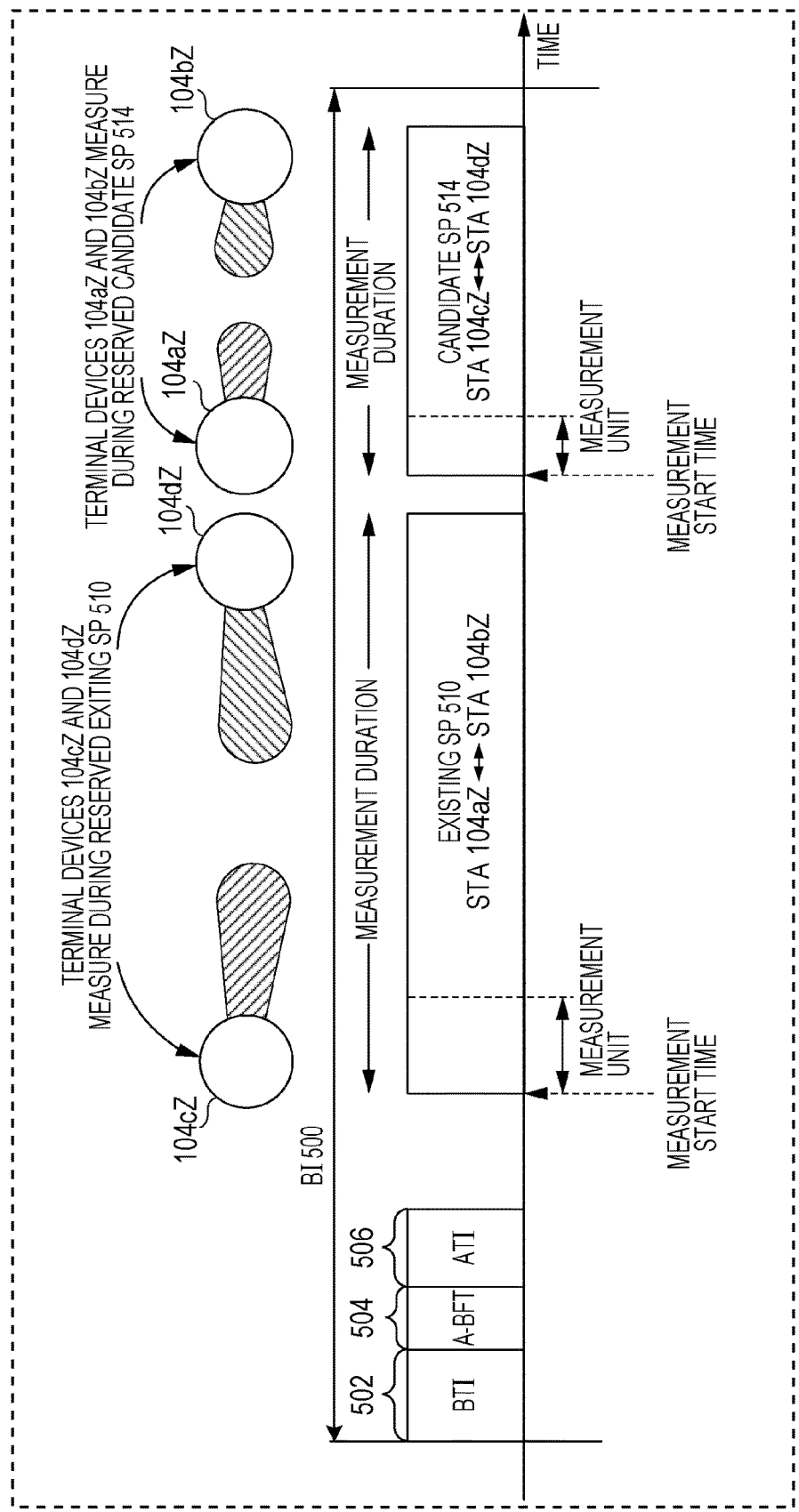
FIG. 19 explains SPSH assessment in a case where an existing SP has been allocated and a candidate SP has been allocated according to a conventional art.

The Measurement Start Time field 1012 indicates the time at which the requested measurement of the wireless environment starts. The Measurement Duration field 1014 indicates the duration of the requested measurement of the wireless environment (Measurement Duration). The relation between the Measurement Start Time field 1012 and the Measurement Duration field 1014 in the measurement request message 1000 is illustrated in FIGS. 18 and 19.

The Number of Time Blocks field 1016 indicates the number of time blocks within the Measurement Duration. The ratio of Measurement Duration to Number of Time Blocks provides the duration of an individual measurement unit, as shown in FIGS. 18 and 19. The Optional Subelements field 1018 contains zero or more subelements and can be used for functional extension.

Figure 17:
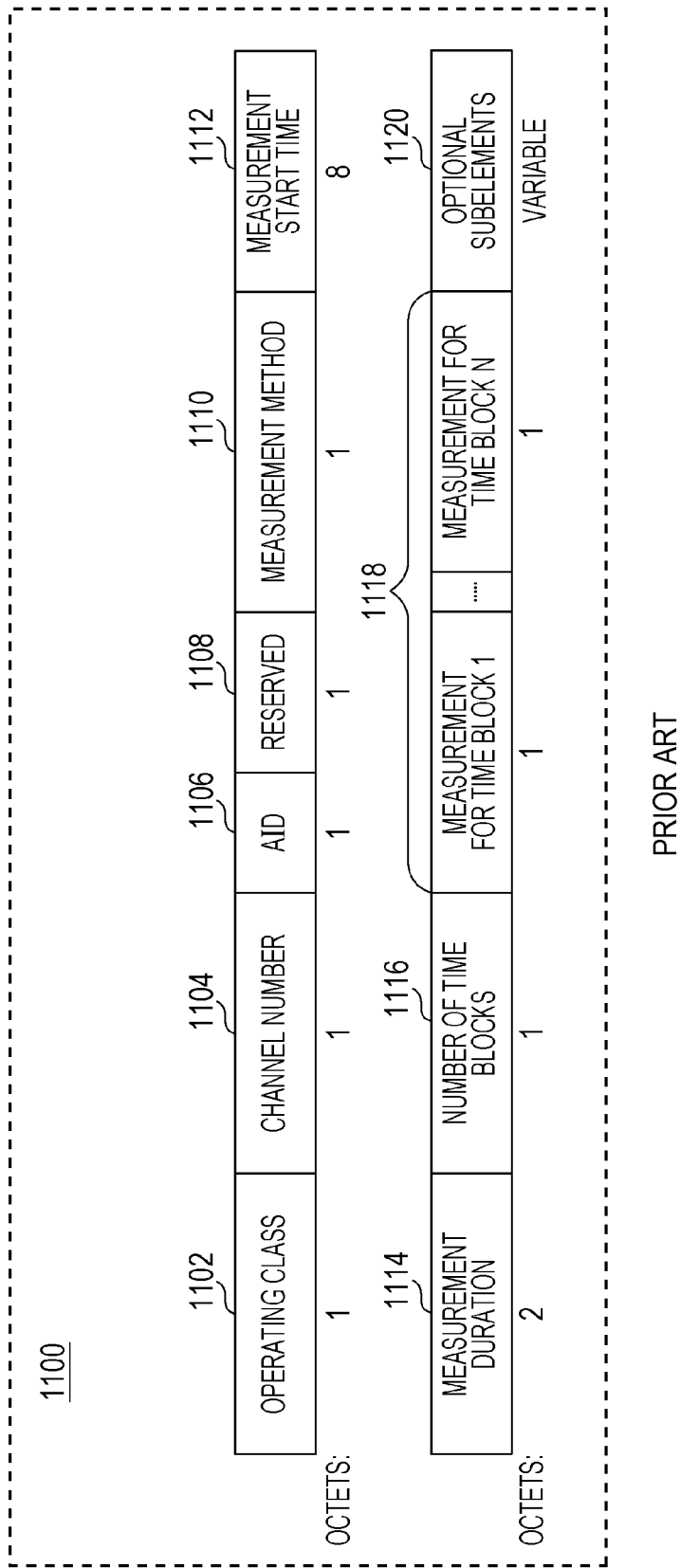
FIG. 17 illustrates an example of a format of a conventional measurement report message.

FIG. 17 is a diagram illustrating an example of a format of a conventional measurement report message 1100. The measurement report message 1100 includes an Operating Class field 1102, a Channel Number field 1104, an AID field 1106, a Reserved field 1108, a Measurement Method field 1110, a Measurement Start Time field 1112, a Measurement Duration field 1114, a Number of Time Blocks field 1116, a plurality of Measurement for Time Block fields 1118, and an Optional Subelements field 1120.

The Operating Class field 1102 and the Channel Number field 1104 respectively indicate the channel set and the channel number to which the measurement report message 1100 applies. The AID field 1106 indicates a target, i.e., a target communication terminal device. The Measurement Method field 1110 indicates the format of the Measurement for Time Block fields 1118, which is, for example, set to ANIPI (Average Noise plus Interference Power Indicator) for the purpose of SPSH assessment.

The Measurement Start Time field 1112 indicates the time at which the requested measurement of the wireless environment starts. The Measurement Duration field 1114 indicates the duration of the requested measurement of the wireless environment. The Number of Time Blocks field 1116 indicates the number of time blocks within the Measurement Duration. Each of the Measurement for Time Block fields 1118 is set to the ANIPI value measured during a time block. The Optional Subelements field 1120 contains zero or more subelements and can be used for functional extension.

A communication period SP may be used as a communication method for two operation types. A communication operation of the first operation type (hereinafter referred to as "the first kind of operation") handles communications between a pair of communication terminal devices separated by a very short distance (e.g., approximately 10 cm). A communication operation of the second operation type (hereinafter referred to as "the second kind of operation") handles communications between a pair of communication terminal devices separated by a distance (e.g., up to 10 m) longer than that of the first kind of operation.

The first kind of operation requires lower transmission power than the second kind of operation. As a consequence, the communication terminal device for the second kind of operation is unlikely to be affected by the interference of radio waves from the communication terminal device for the first kind of operation during measurement of a wireless environment in SPSH assessment with the communication terminal device for the first kind of operation.

However, the communication terminal device for the first kind of operation is likely to be affected by the interference of radio waves from the communication terminal device for the second kind of operation due to higher transmission power in the communication terminal device for the second kind of operation during measurement of a wireless environment in SPSH assessment with the communication terminal device for the second kind of operation.

In a case where the communication terminal device for the first kind of operation whose transmission power is low is allocated the existing SP 510, the existing SP 510 and the candidate SP 514 are affected by the interference of radio waves during communication of the communication terminal devices. This makes it difficult to achieve spatial sharing (SPSH).

In a case where both of the communication types ((communication) operation types) in the existing SP 510 and the candidate SP 514 are for the first kind of operation (i.e., communication in the existing SP 510 and the candidate SP 514 is short-distance communication whose communication distance is short), the communication terminal devices 104$c$Z and 104$d$Z involved in the candidate SP 514 perform measurement of a wireless environment from the start time of measurement of the existing SP 510 in FIGS. 14 and 15. The communication terminal devices 104$a$Z and 104$b$Z involved in the existing SP 510 also perform measurement of a wireless environment from the start time of measurement of the candidate SP 514 when the candidate SP 514 has been allocated channel time before the SPSH assessment is initiated.

However, in SPSH assessment, the wireless environment measured by the communication terminal devices may be unnecessary because interference of radio waves does not occur due to lower transmission power for the first kind of operation. The unnecessary measurement would increase communication terminal device power consumption. Channel efficiency is also degraded due to transmission of unnecessary measurement request and report messages.

Similarly, in a case where one of the existing SP 510 and the candidate SP 514 is for the first kind of operation and the other is for the second kind of operation, the communication terminal devices 104$c$Z and 104$d$Z involved in the candidate SP 514 perform measurement of a wireless environment from the start time of measurement of the existing SP 510 in FIGS. 14 and 15. The communication terminal devices 104$a$Z and 104$b$Z involved in the existing SP 510 also perform measurement of a wireless environment from the start time of measurement of the candidate SP 514 when the candidate SP 514 has been allocated channel time before the SPSH assessment is initiated.

However, measurement of the wireless environment performed by the communication terminal devices involved in the SP for the second kind of operation is considered unnecessary because radio wave interference does not occur due to lower transmission power for the first kind of operation than for the second kind of operation.

Note that in a case where the existing SP 510 is for the first kind of operation and the candidate SP 514 that has not been allocated channel time is for the second kind of operation, the communication terminal devices 104$c$Z and 104$d$Z involved in the candidate SP 514 measure a wireless environment from the start time of measurement of the existing SP 510. In this case, the communication control station device 102Z is likely to mistakenly determine that the communication terminal devices 104$c$Z and 104$d$Z are not affected by interference in the existing SP 510 because it is difficult to detect low transmission power for the first kind of operation (that is, the communication terminal devices 104aZ and 104bZ), even if the wireless environment is measured by the communication terminal devices 104cZ and 104dZ.

Since the transmission power of the communication terminal devices 104cZ and 104dZ for the second kind of operation is higher than that of the communication terminal devices 104aZ and 104bZ for the first kind of operation, the transmission power of the communication terminal devices 104cZ and 104dZ for the second kind of operation affects communication of the communication terminal devices 104aZ and 104bZ for the first kind of operation. This is considered to make SPSH difficult.

In view of this, the present embodiment described below discusses an example of a communication control station device, a communication terminal device, and a communication control method that achieves spatial sharing (SPSH) for achieving concurrent communication of different pairs of communication terminal devices, even in a case where there is a difference in transmission power during communication between one communication period (SP) and the other communication period (SP).

An embodiment (present embodiment) of a communication control station device, a communication terminal device, and a communication control method according to the present disclosure is described in detail with reference to the drawings. In the present embodiment, description of matters that are also described in the conventional art is simplified or omitted, and differences from the conventional art are described.

Figure 1:
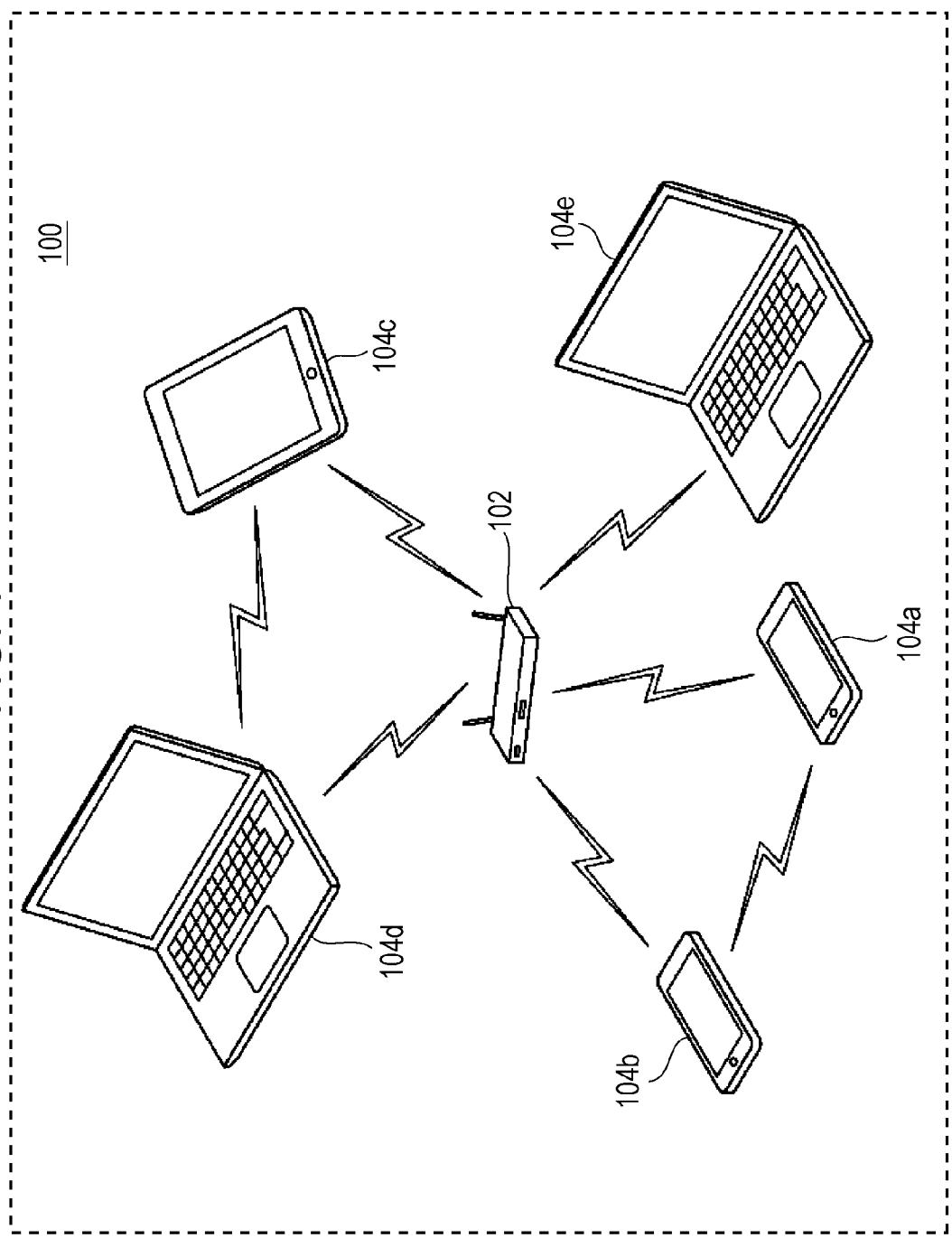
FIG. 1 illustrates an example of a system configuration of a centralized WiGig network including a communication control station device and a plurality of communication terminal devices according to the present embodiment.

FIG. 1 is a system configuration diagram illustrating an example of a centralized WiGig network 100 including a communication control station device 102 and a plurality of communication terminal devices 104a, 104b, 104c, 104d, and 104e according to the present embodiment. The centralized WiGig network 100 illustrated in FIG. 1 includes the communication control station device 102a and the plurality of (e.g., five) communication terminal devices 104a, 104b, 104c, 104d, and 104e.

In FIG. 1, the communication control station device 102 has an identical wireless communication function to that of the communication terminal devices 104a, 104b, 104c, 104d, and 104e. The communication control station device 102 controls not only communication between the communication control station device 102 and a single communication terminal device (e.g., the communication terminal device 104a), but also direct communication between two communication terminal devices (e.g., the communication terminal devices 104a and 104b).

Figure 2:
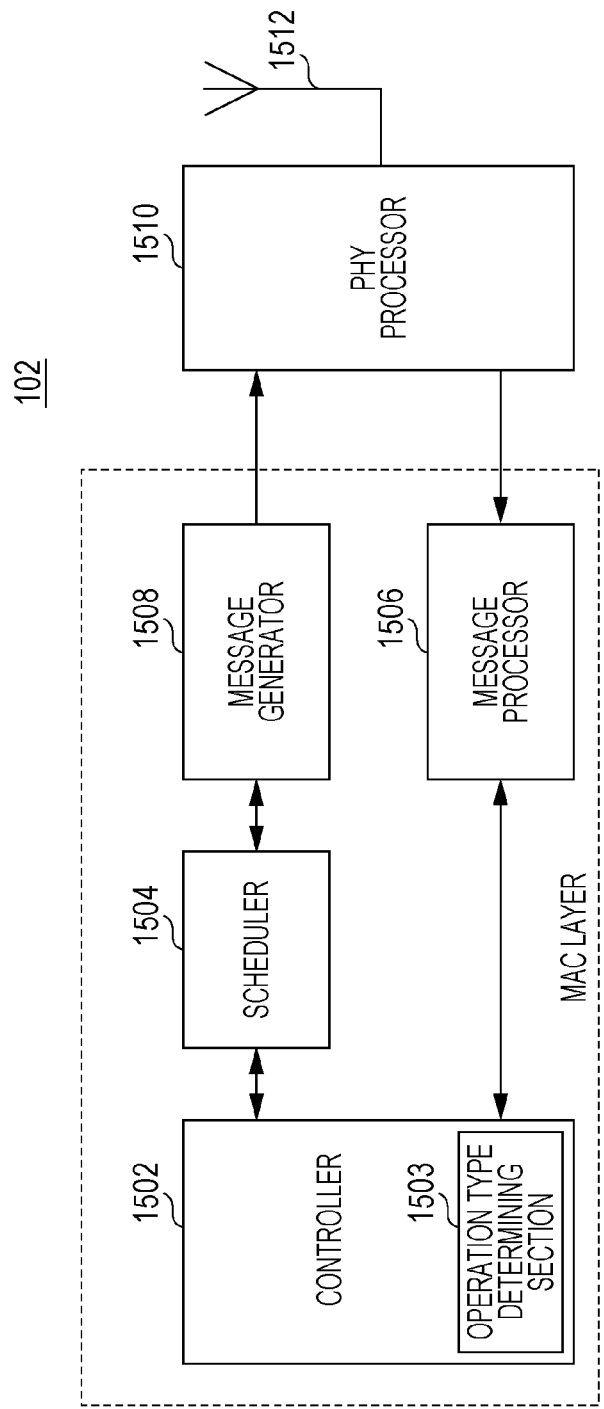
FIG. 2 illustrates an example of an architecture of the communication control station device according to the present embodiment.

FIG. 2 is a block diagram illustrating an example of an architecture of the communication control station device 102 according to the present embodiment. The communication control station device 102 illustrated in FIG. 2 includes a controller 1502, a scheduler 1504, a message processor 1506, a message generator 1508, a PHY (Physical) processor 1510, and a transmitter/receiver 1512 including an antenna. The controller 1502 includes an operation type determining section 1503.

The operation type determining section 1503 determines an operation type included in an SP request message transmitted from any of the communication terminal devices. As described above, the operation type includes the first kind of operation, which is short-distance communication including proximity communication over a short distance (e.g., approximately 10 cm), and the second kind of operation, which is communication over a longer distance (e.g., approximately 10 m) than that of the first kind of operation.

The communication control station device 102 includes at least scheduling information concerning the schedule of communication allocated by the scheduler 1504 on the basis of the operation type determined by the operation type determining section 1503 and information concerning the operation type, and transmits SP allocation information generated by the message generator 1508 to the communication terminal devices 104a, 104b, 104c, 104d, and 104e via the PHY processor 1510.

Figure 3:
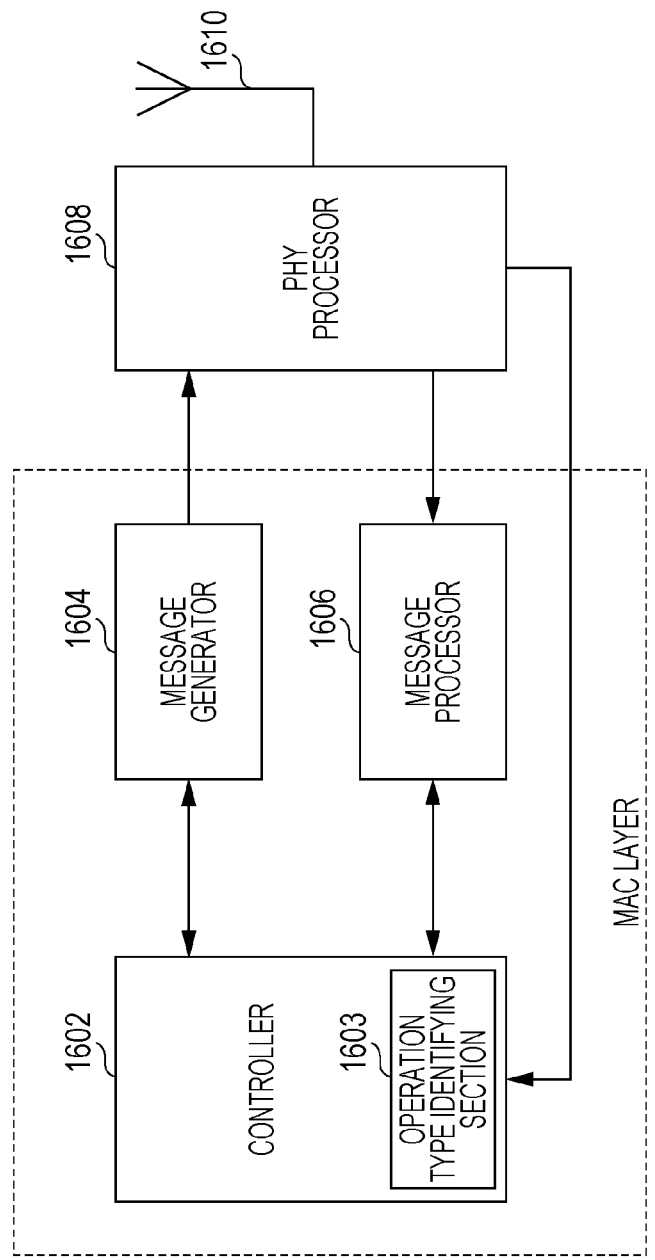
FIG. 3 illustrates an example of an architecture of each of the communication terminal devices according to the present embodiment.

FIG. 3 is a block diagram illustrating an example of a functional architecture of the communication terminal devices 104a, 104b, 104c, 104d, and 104e according to the present embodiment. Each of the communication terminal devices 104a, 104b, 104c, 104d, and 104e illustrated in FIG. 3 includes a controller 1602, a message generator 1604, a message processor 1606, a PHY processor 1608, and a transmitter/receiver 1610 including an antenna. The controller 1602 includes an operation type identifying section 1603.

The communication terminal devices 104a, 104b, 104c, 104d, and 104e transmit an SP request message to the communication control station device 102 via the PHY processor 1608 in order to request allocation of a communication period (SP) by the communication control station device 102. The controller 1602 of the communication terminal devices 104a, 104b, 104c, 104d, and 104e designates an operation type that is used or available in the requested SP, and the message generator 1604 generates an SP request message including the designated operation type.

The operation type identifying section 1603 identifies the operation type of the SP on the basis of the SP allocation information transmitted from the communication control station device 102 in accordance with the SP request message.

Upon receipt of a measurement request message (see FIG. 8) from the communication control station device 102, the PHY processor 1608 performs measurement of a wireless environment and then notifies the controller 1602 of the results of measurement. The PHY processor 1608, which is an example of a reporting section, reports (replies), to the communication control station device 102 via the transmitter/receiver 1610a, measurement report message (see FIG. 8) including the results of measurement generated by the message generator 1604 on the basis of an instruction of the controller 1602.

Figure 4:
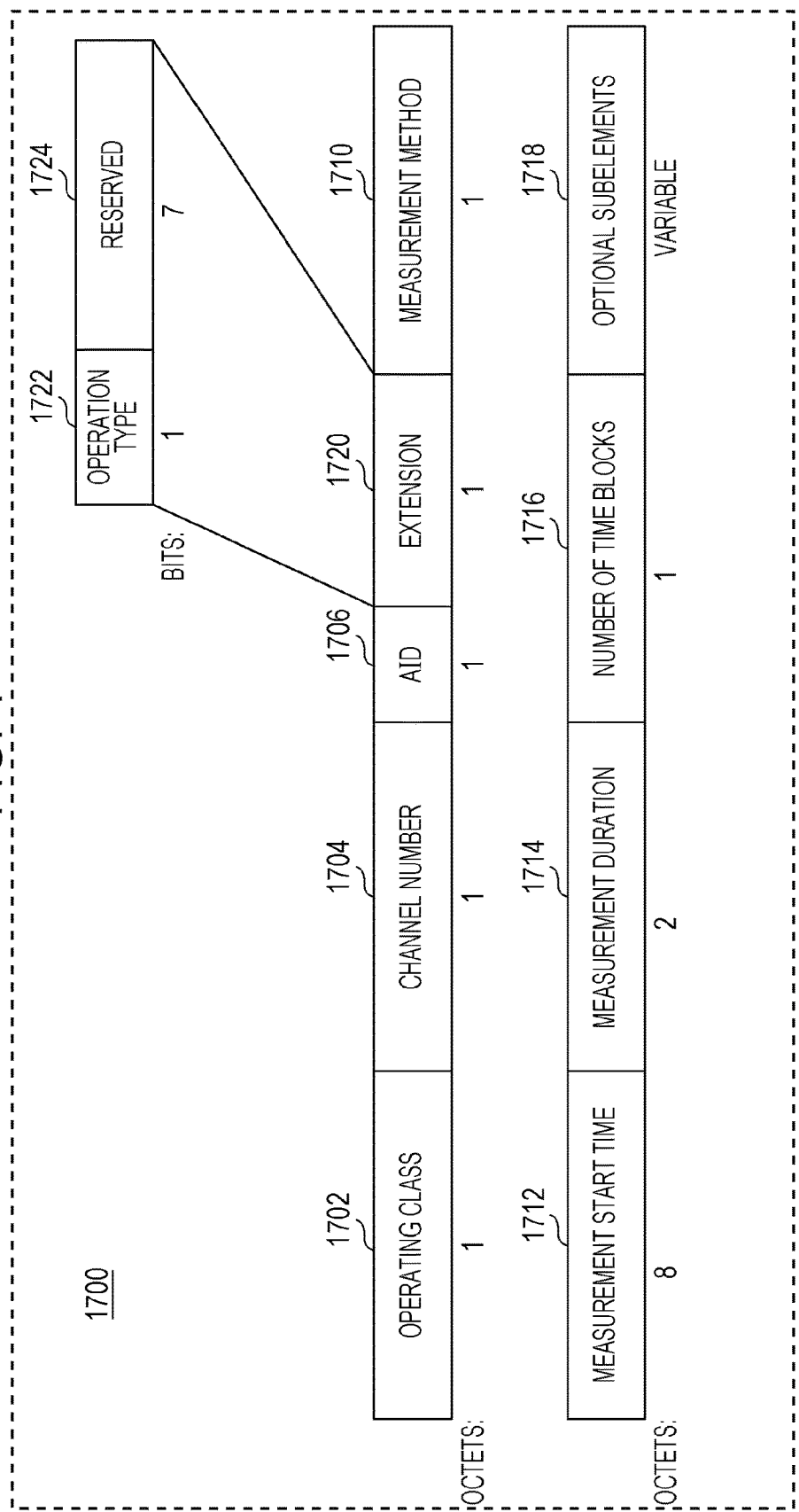
FIG. 4 illustrates an example of a format of a measurement request message according to the present embodiment.

FIG. 4 is a diagram illustrating an example of a format of a measurement request message 1700 according to the present embodiment. The measurement request message 1700 includes an Operating Class field 1702, a Channel Number field 1704, an AID field 1706, an Extension field 1720, a Measurement Method field 1710, a Measurement Start Time field 1712, a Measurement Duration field 1714, a Number of Time Blocks field 1716, and Optional Subelements field 1718.

A difference from the measurement request message 1000 illustrated in FIG. 16 is that the Extension field 1720 whose size is 1 octet, which is the same as the Reserved field 1008 illustrated in FIG. 16, includes a 1-bit operation type 1722 and a 7-bit Reserved field 1724. The other fields are same as those in FIG. 16, and are therefore not explained repeatedly.

Figure 5:
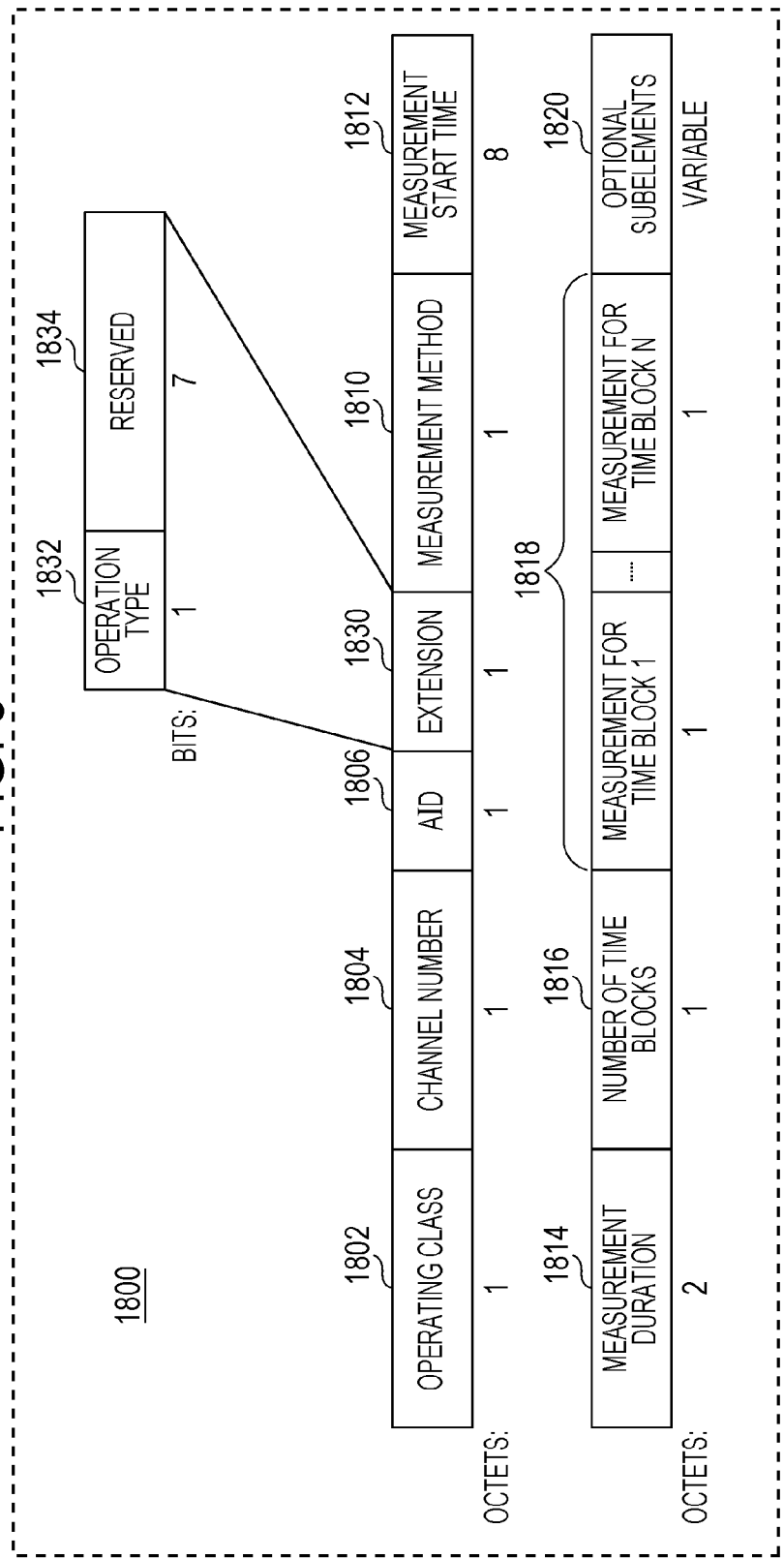
FIG. 5 illustrates an example of a format of a measurement report message according to the present embodiment.

FIG. 5 is a diagram illustrating an example of a format of a measurement report message 1800 according to the present embodiment. The measurement report message 1800 includes an Operating Class field 1802, a Channel Number field 1804, an AID field 1806, an Extension field 1830, a Measurement Method field 1810, a Measurement Start Time field 1812, a Measurement Duration field 1814, a Number of Time Blocks field 1816, a plurality of Measurement for Time Block fields 1818, and an Optional Subelements field 1820.

A difference from the measurement report message 1100 illustrated in FIG. 17 is that the Extension field 1830 whose size is 1 octet, which is the same as the Reserved field 1108 illustrated in FIG. 17, includes a 1-bit operation type 1832 and a 7-bit Reserved field 1834. The other fields are same as those in FIG. 17, and are therefore not explained repeatedly.

Next, a procedure through which the communication control station device 102 according to the present embodiment determines whether or not spatial sharing (SPSH) is applied, for example, between communication of the communication terminal devices 104a and 104b and communication of the communication terminal devices 104c and 104d is described with reference to FIGS. 6, 7, and 8.

Figure 6:
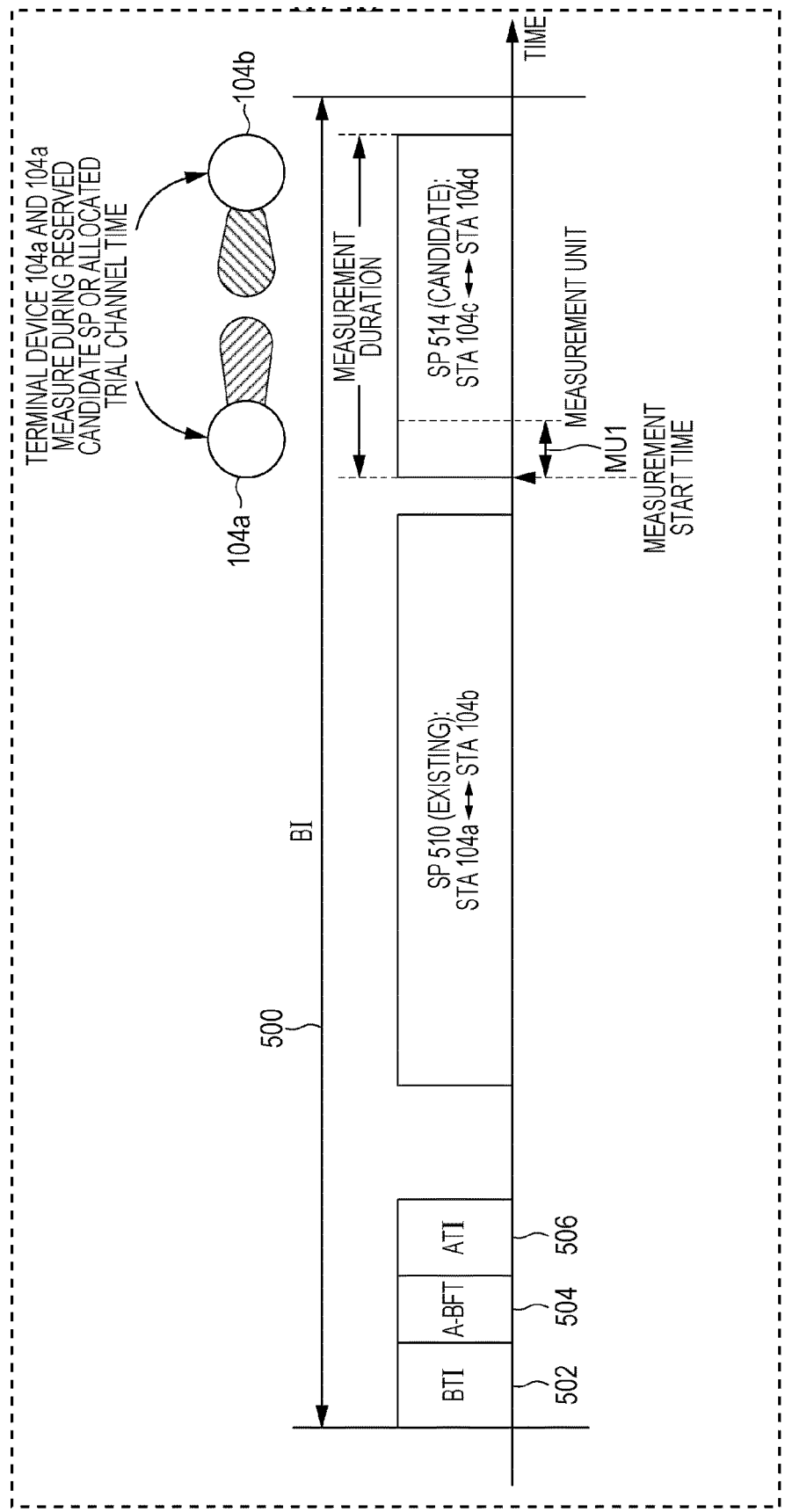
FIG. 6 explains SPSH assessment between an existing SP for the first kind of operation and a candidate SP for the second kind of operation in a BI according to the present embodiment.

FIG. 6 is an explanatory view of SPSH assessment between an existing SP 510 for the first kind of operation and a candidate SP 514 for the second kind of operation in a BI 500 according to the present embodiment. FIG. 7 is a flow chart for explaining an operation procedure through which the communication control station device 102 according to the present embodiment determines whether or not spatial sharing (SPSH) is applied between the existing SP 510 and the candidate SP 514. FIG. 8 is a sequence diagram for explaining an operation procedure of signaling concerning SPSH assessment in the communication control station device 102 according to the present embodiment, the communication terminal devices 104a and 104b involved in the existing SP 510, and the communication terminal devices 104c and 104d involved in the candidate SP 514.

Figure 7:
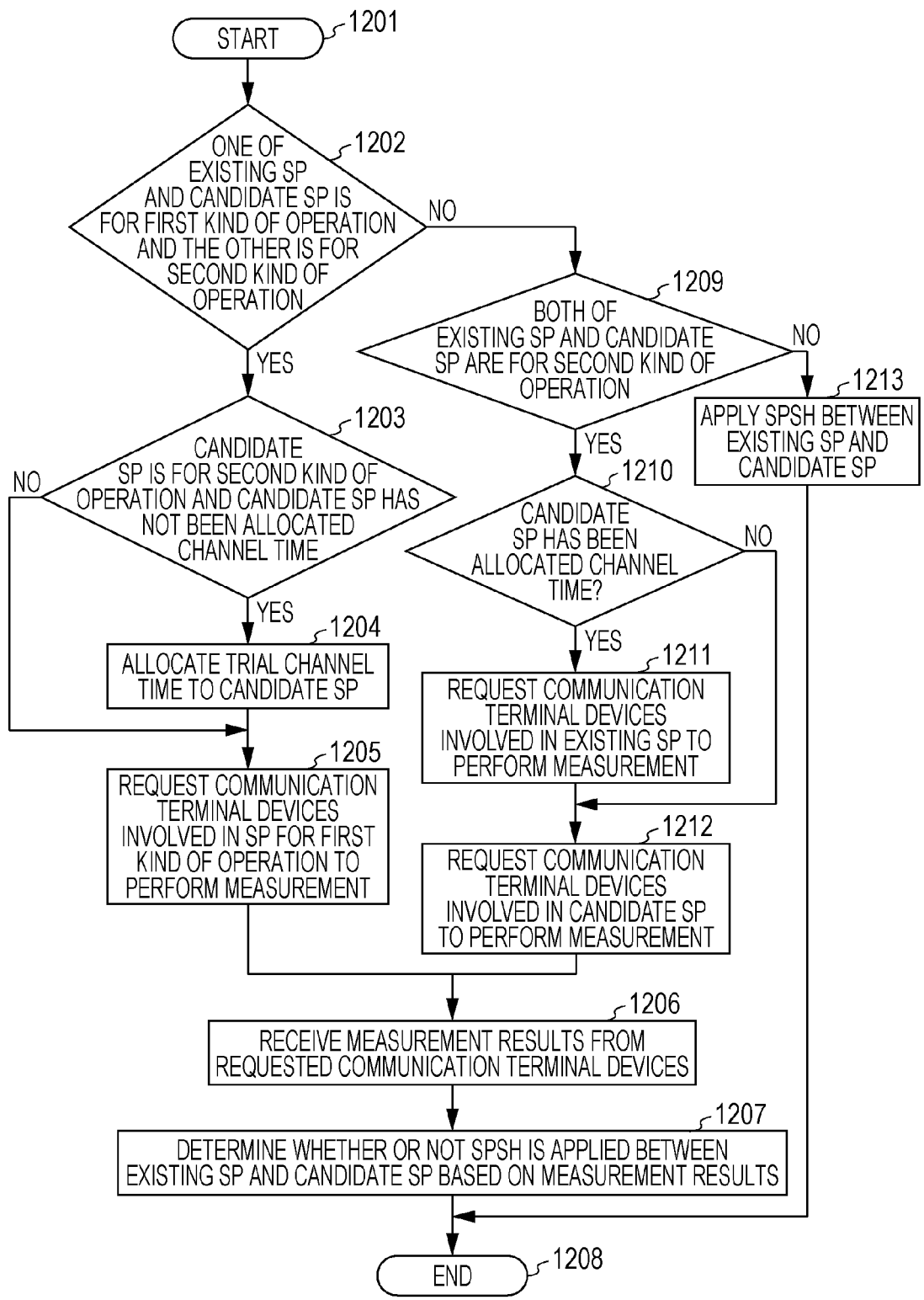
FIG. 7 illustrates a flow chart of an operation procedure through which the communication control station device according to the present embodiment determines whether or not spatial sharing (SPSH) is applied between the existing SP and the candidate SP.
Figure 8:
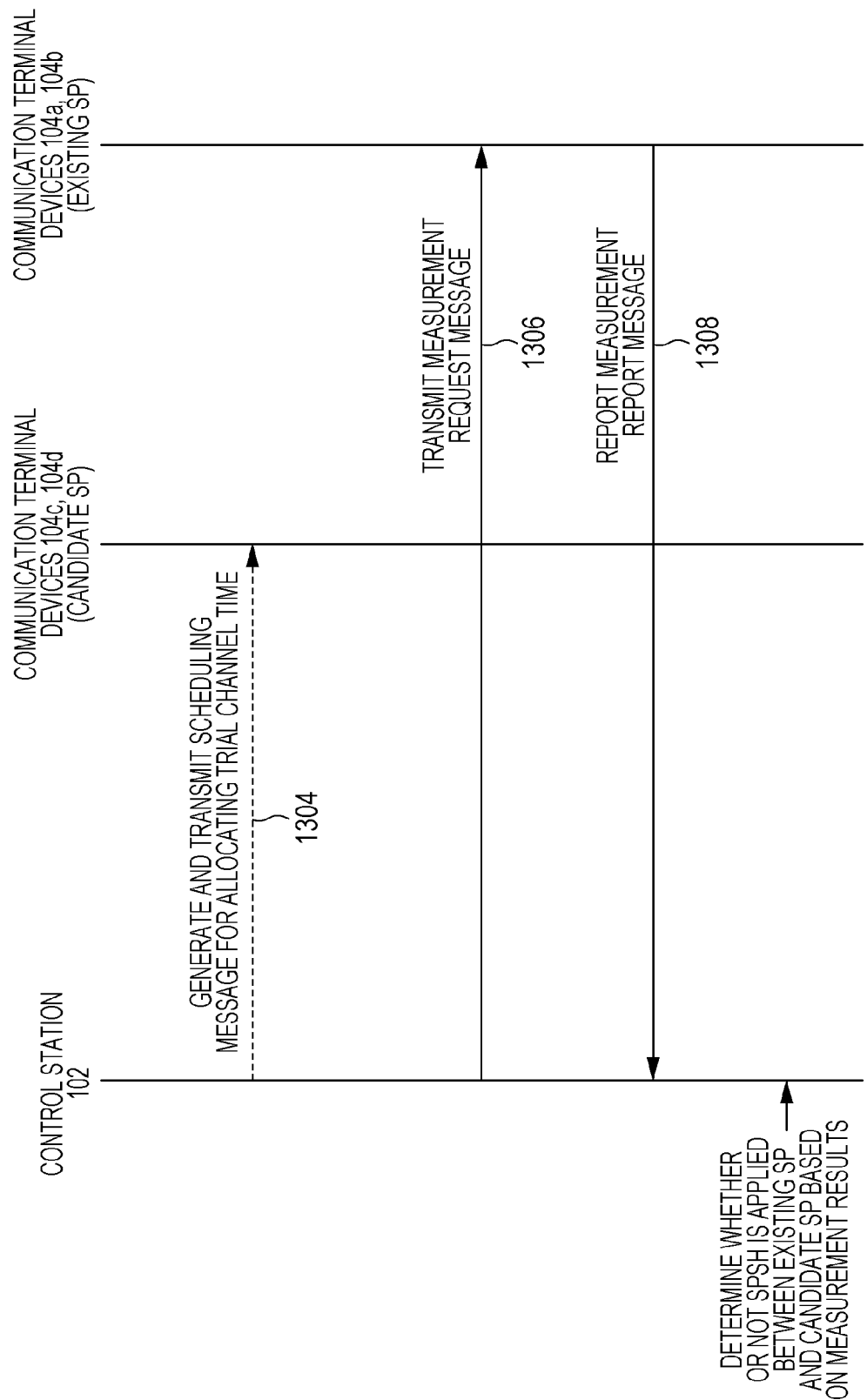
FIG. 8 illustrates a sequence of an operation procedure of signaling concerning SPSH assessment between the communication control station device according to the present embodiment, the communication terminal devices involved in the existing SP, and the communication terminal devices involved in the candidate SP.

In FIG. 7, the communication control station device 102 initiates SPSH assessment (S1201). The operation type determining section 1503 of the communication control station device 102 determines whether or not one of the existing SP 510 and the candidate SP 514 is for the first kind of operation and the other is for the second kind of operation (S1202).

In a case where one of the existing SP 510 and the candidate SP 514 is for the first kind of operation and the other is for the second kind of operation (YES in S1202), the scheduler 1504 of the communication control station device 102 determines whether or not the candidate SP 514 is for the second kind of operation and the candidate SP 514 has not been allocated channel time before SPSH assessment is initiated (S1203).

In a case where the candidate SP 514 is for the second kind of operation and the candidate SP 514 has not been allocated channel time before SPSH assessment is initiated (YES in S1203), the scheduler 1504 of the communication control station device 102 generates scheduling information to allocate trial channel time to the communication terminal devices 104c and 104d involved in the candidate SP 514 (S1204).

The trial channel time is a period temporarily set as the candidate SP 514 that is used for measurement of a wireless environment for judging whether or not SPSH is applied. The duration of the trial channel time is preferably a minimum time needed for measurement of the wireless environment and may be shorter than a time needed for communication.

The message generator 1508 of the communication control station device 102 generates a scheduling message 1304 including scheduling information generated by the scheduler 1504, and the PHY processor 1510 of the communication control station device 102 transmits the scheduling message 1304 to the communication terminal devices 104c and 104d involved in the candidate SP 514. In this way, the communication control station device 102 allocates trial channel time to the communication terminal devices 104c and 104d involved in the candidate SP 514.

After receiving the scheduling message 1304 transmitted from the communication control station device 102, the PHY processor 1608 of the communication terminal devices 104c and 104d involved in the candidate SP 514 preferably generates a measurement packet (e.g., null data packet (NDP)) and transmit the measurement packet via the transmitter/receiver 1610 during the allocated trial channel time in order that the communication terminal devices 104a and 104b involved in the existing SP 510 measure a wireless environment. This makes it possible for the communication terminal devices 104c and 104d involved in the candidate SP 514 to shorten a time needed for measurement of the wireless environment, thereby suppressing interference of radio waves during measurement of the wireless environment by the communication terminal devices 104a and 104b involved in the existing SP 510.

Meanwhile, in a case where the candidate SP 514 is for the first kind of operation and the candidate SP 514 has been allocated channel time before SPSH assessment is initiated (NO in S1203) or after the communication terminal devices 104c and 104d involved in the candidate SP 514 have been allocated the trial channel time (1204), the message generator 1508, which is an example of a measurement ordering section, of the communication control station device 102 generates a measurement request message 1306 and transmits the measurement request message 1306 via the PHY processor 1510 and the transmitter/receiver 1512 to the communication terminal devices 104a and 104b involved in the existing SP 510 for the first kind of operation (S1205).

Note that the measurement request message 1306 is used to request measurement of a wireless environment used for determining whether or not SPSH with the communication terminal devices 104c and 104d involved in the candidate SP 514 for the second kind of operation is applied. Note that in a case of NO in Step S1203, an SP for the first kind of operation may be a candidate SP.

After receiving the measurement request message 1306 transmitted from the communication control station device 102, the PHY processor 1608 of the communication terminal devices 104a and 104b involved in the existing SP 510 measures a wireless environment during the trial channel time from a start time of measurement (Measurement Start Time) of the candidate SP 514 for the second kind of operation.

Furthermore, the message generator 1604 of the communication terminal devices 104a and 104b generates a measurement report message 1308 by using the results of measurement and reports the measurement report message 1308 to the communication control station device 102 via the transmitter/receiver 1610. That is, the communication terminal devices 104c and 104d involved in the candidate SP 514 for the second kind of operation can omit measurement of a wireless environment.

Note that in a case where a communication terminal device (e.g., the communication terminal device 104a) receives frames of a measurement packet from a communication partner (e.g., the communication terminal device 104b) involved in an SP for the first kind of operation, the communication terminal device 104a preferably forms the same directivity as the directivity of the transmitter/receiver 1610 of the communication terminal device 104b.

In a case where both of the existing SP 510 and the candidate SP 514 are for the first kind of operation or the second kind of operation (NO in S1202), the controller 1502 of the communication control station device 102 determines whether or not both of the existing SP 510 and the candidate SP 514 are for the second kind of operation (S1209).

In a case where both of the existing SP 510 and the candidate SP 514 are for the first kind of operation (NO in S1209), the communication control station device 102 omits request for measurement of a wireless environment to both of the communication terminal devices 104*a* and 104*b* involved in the existing SP 510 and the communication terminal devices 104*c* and 104*d* involved in the candidate SP 514, determines that SPSH can be applied between the existing SP 510 and the candidate SP 514, and therefore applies SPSH (S1213). Thus, the processing in the communication control station device 102 is finished (S1208), and communication is performed by using the schedule of FIG. 13.

In a case where both of the existing SP 510 and the candidate SP 514 are for the second kind of operation (YES in S1209), the communication control station device 102 determines whether or not the candidate SP 514 has been allocated channel time before SPSH assessment is initiated (S1210).

In a case where the candidate SP 514 has been allocated channel time before SPSH assessment is initiated (YES in S1210), the message generator 1508 of the communication control station device 102 generates a measurement request message and transmits the measurement request message to the communication terminal devices 104*a* and 104*b* involved in the existing SP 510 via the transmitter/receiver 1512 (S1211).

Then, the message generator 1508 generates a measurement request message and transmits the measurement request message to the communication terminal devices 104*c* and 104*d* involved in the candidate SP 514 via the transmitter/receiver 1512 (S1212). Note that in a case of YES in Step S1210, Steps S1211 and S1212 may be executed together.

Note that the measurement request message is used to request measurement of a wireless environment used in evaluation of whether or not SPSH with the communication terminal devices 104*a* and 104*b* involved in the existing SP 510 for the second kind of operation is applied and evaluation of whether or not SPSH with the communication terminal devices 104*c* and 104*d* involved in the candidate SP 514 for the second kind of operation is applied.

After receiving the measurement request message transmitted from the communication control station device 102, the PHY processor 1608 of the communication terminal devices 104*c* and 104*d* involved in the candidate SP 514 measures a wireless environment during a predetermined period (Measurement Unit) MU1 from a start time of measurement (Measurement Start Time) of the existing SP 510.

The message generator 1604 of the communication terminal devices 104*c* and 104*d* generates a measurement report message including the results of measurement of a wireless environment and reports the measurement report message to the communication control station device 102 via the transmitter/receiver 1610.

Note that in a case where a communication terminal device (e.g., the communication terminal device 104*c*) receives frames of a measurement packet from a communication terminal device (e.g., the communication terminal device 104*a*) involved in an SP for the second kind of operation, the communication terminal device 104*c* performs beamforming training with the communication terminal device 104*d* to forms the same reception directivity as the determined directivity of the antenna of the transmitter/receiver 1610.

After receiving the measurement request message transmitted from the communication control station device 102, the PHY processor 1608 of the communication terminal devices 104*a* and 104*b* involved in the existing SP 510 measures a wireless environment during a predetermined period (Measurement Unit) MU1 from a start time of measurement (Measurement Start Time) of the candidate SP 514.

The message generator 1604 of the communication terminal devices 104*a* and 104*b* generates a measurement report message including the results of measurement of the wireless environment and reports the measurement report message to the communication control station device 102 via the transmitter/receiver 1610.

Note that in a case where a communication terminal device (e.g., the communication terminal device 104*a*) receives frames of a measurement packet from a communication partner (e.g., the communication terminal device 104*b*) involved in an SP for the second kind of operation, the communication terminal device 104*a* forms the same directivity as the directivity of the transmitter/receiver 1610 of the communication terminal device 104*b*.

Note that in a case where the candidate SP 514 has not been allocated channel time before SPSH assessment is initiated (NO in S1210), the communication control station device 102 omits request for measurement to the communication terminal devices 104*a* and 104*b* involved in the existing SP 510 and requests the communication terminals 104*c* and 104*d* involved in the candidate SP 514 to perform measurement (S1212).

In FIG. 7, Step S1212 is performed after Step S1210, but Step S1212 may be performed before Step S1210.

After Step S1205 or S1212, the communication control station device 102 receives the measurement report message from each of the communication terminal devices (S1206). The scheduler 1504, which is an example of a scheduling section, of the communication control station device 102 determines whether or not SPSH is applied between the existing SP 510 and the candidate SP 514 on the basis of the results of measurement included in the measurement report message received in Step S1206 (S1207).

In a case where the communication control station device 102 determines that it is possible to apply SPSH between the existing SP 510 and the candidate SP 514, the communication control station device 102 applies SPSH between the existing SP 510 and the candidate SP 514, and thus the processing in the communication control station device 102 is finished.

As described above, the communication control station device 102 according to the present embodiment first determines whether or not the existing SP 510 and the candidate SP 514 are the first kind or second kind of operation in order to determine whether or not spatial sharing (SPSH) is applied between different pairs of communication terminal devices, e.g., the pair of communication terminal devices 104*a* and 104*b* and the pair of communication terminal devices 104*c* and 104*d*.

In a case where both of the existing SP 510 and the candidate SP 514 are for the first kind of operation, the communication control station device 102 omits request for measurement of a wireless environment to each of the communication terminal devices. This makes it unnecessary to transmit a measurement request message to each of the communication terminal devices involved in the existing SP 510 and the candidate SP 514 and report the measurement report message and to measure a wireless environment. As a result, it is possible to reduce power consumption in each of the communication terminal devices, thereby improving the channel efficiency.

In a case where one of the existing SP 510 and the candidate SP 514 is for the first kind of operation and the other is for the second kind of operation, the communication control station device 102 transmits a measurement request message to each of the communication terminal devices involved in the communication period (SP) for the first kind of operation so as to request for measurement of a wireless environment.

In other words, even in a case where the candidate SP 514 is allocated channel time before SPSH assessment is initiated, the communication control station device 102 requests a group of communication terminal devices involved in the existing SP 510 or the candidate SP 514 to perform measurement of a wireless environment instead of requesting both of a group of communication terminal devices involved in the existing SP 510 and a group of communication terminal device involved in the candidate SP 514 to perform measurement of a wireless environment. This allows the communication control station device 102 to reduce power consumption of communication terminal devices during measurement of a wireless environment used for determining whether or not SPSH is applied, thereby improving the channel efficiency.

In a case where the existing SP 510 is for the first kind of operation and the candidate SP 514 is for the second kind of operation and where the candidate SP 514 has not been allocated channel time before SPSH assessment is initiated (YES in S1203), the communication control station device 102 needs to allocate the candidate SP 514 channel time before measurement of the candidate SP 514, and therefore the communication control station device 102 allocates the candidate SP 514 trial channel time by transmitting a scheduling message to communication terminal devices involved in the candidate SP 514.

Note that the trial channel time is set in a period that does not overlap the existing SP 510 because the trial channel time is a period that is temporarily set to measure an interference state caused by a difference in operation.

Subsequently, the communication control station device 102 requests the communication terminal devices 104a and 104b involved in the existing SP 510 to perform measurement of a wireless environment during the allocated trial channel time of the candidate SP 514.

This allows the communication terminal devices 104a and 104b involved in the existing SP 510 to detect interference, which occurs due to high transmission power, from the communication terminal devices 104c and 104d involved in the candidate SP 514 for the second kind of operation.

Therefore, the communication control station device 102 can properly determine whether or not SPSH is applied between the existing SP 510 and the candidate SP 514 since the communication control station device 102 determines whether or not SPSH is applied on the basis of the results of measurements by the communication terminal devices 104a and 104b for the first kind of operation and the results of measurements by the communication terminal devices 104c and 104d for the second kind of operation during the trial channel time in consideration of transmission power of the communication terminal devices.

In other words, the communication control station device 102 can avoid the conventional problem of mistakenly determining that SPSH can be applied assuming that no interference of radio waves occurs even though there is a possibility that interference of radio waves occur in actual communication due to mixture of the first kind of operation and the second kind of operation.

The embodiments have been described with reference to the drawings. However, needless to say, the present disclosure is not limited to these examples. It is evident that a person skilled in the art can arrive at various changes and modifications within the scope described in the embodiments, and it is understood that such changes and modifications are also encompassed within the technical scope of the present disclosure.

In the embodiments, an example in which the present disclosure is realized by way of hardware has been described. However, the present disclosure may be realized by software in association with hardware.

The functional blocks used for description of the embodiments are realized as LSI, which is typically an integrated circuit. These functional blocks may be realized as individual chips or part of or all of these functional blocks may be realized as one chip. The LSI may be referred to as IC, system LSI, super LSI, or ultra LSI depending on a difference in the degree of integration.

The present disclosure is useful as a communication control station device, a communication terminal device, and a communication control method that achieve spatial sharing (SPSH) for achieving concurrent communication of different pairs of communication terminal device even in a case where there is a difference in transmission power in communication between one communication period (SP) and the other communication period (SP).

What is claimed is:

1. A communication control station device comprising:
circuitry;
a receiver coupled to the circuitry; and
a transmitter coupled to the circuitry,
wherein, in response to determining that a long range communication operation is performed in a first communication period and a second communication period:
the circuitry:
decides to generate or omit generation of a first measurement request message to a first group of communication terminal devices using the first communication period based on whether an allocation of a channel time to the second communication period is implemented or not;
generates a second measurement request message to a second group of communication terminal devices using the second communication period; and
allocates a first schedule of the spatial sharing based on one or more results of measurements in the first and second communication periods;
the transmitter:
transmits the second measurement request message to the second group of communication terminal devices; and
further transmits the first measurement request message to the first group of communication terminal devices and the first schedule of the spatial sharing to the first group of communication terminal devices, in response to the circuitry deciding to generate the first measurement request massage, and the receiver:
  receives the one or more results of measurements in the first and second communication periods, wherein at least one of the one or more results of measurements in the first and second communication periods are in accordance with the second measurement request message,
wherein, in response to determining that a short range communication operation shorter than the long range communication operation is performed in any one of the first communication period and the second communication period:
  the circuitry:
    generates any one of the first and the second measurement request message requesting any one of the first and the second group of communication terminal devices using the short range communication operation; and
    allocates a second schedule of a spatial sharing based on results of measurement, wherein the results of measurement are in accordance with the generated any one of the first and the second measurement request message;
  the transmitter:
    transmits any one of the first and the second measurement request message to any one of the first and the second group of communication terminal devices using the short range communication operation and the second schedule of the spatial sharing to the first group of communication terminal devices and the second group of communication terminal devices, and
  the receiver:
    receives the results of measurement,
wherein, in response to determining that the short range communication operation is performed in both the first communication period and the second communication period:
  the circuitry:
    omits generation of the first and the second measurement request messages; and
    allocates a third schedule of the spatial sharing in the first and second communication periods; and
  the transmitter:
    transmits the third schedule of the spatial sharing to the first group of communication terminal devices and the second group of communication terminal devices.

2. The communication control station device according to claim 1, wherein:
  in response to determining the short range communication operation is performed in the first communication period, the long range communication operation is performed in the second communication period;
  in response to determining the second communication period is not allocated channel time:
    the circuitry allocates predetermined trial channel time to the second communication period,
    generates the first measurement request message for the first group of communication terminal devices to perform the predetermined measurement, and omits generation of the second measurement request message for the second group of communication terminal devices to perform the predetermined measurement, and
    the transmitter transmits the first measurement request message to the first group of communication terminal devices, and transmits the schedule of the spatial sharing to the first group of communication terminal devices and the second group of communication terminal devices,
  wherein the predetermined trial channel time does not overlap with the first communication period.

3. A communication control method in a communication control station device, the method comprising:
  in response to determining that a long range communication operation is performed in both of a first communication period and a second communication period:
    deciding to generate or omit generation of a first measurement request message to a first group of communication terminal devices using the first communication period based on whether an allocation of a channel time to the second communication period is implemented or not;
    generating a second measurement request message to a second group of communication terminal devices using the second communication period;
    receiving one or more results of measurements in the first and second communication periods, wherein at least one of the one or more results of measurements in the first and second communication periods are in accordance with the generated second measurement request message;
    allocating a first schedule of the spatial sharing based on the one or more results of measurements in the first and second communication periods;
    transmitting the second measurement request message to the second group of communication terminal devices, and
    further transmitting the first measurement request message to the first group of communication terminal devices and the first schedule of the spatial sharing to the first group of communication terminal devices, in response to the circuitry decides to generate of the first measurement request massage,
  in response to determining that a short range communication operation shorter than the long range communication operation is performed in any one of the first communication period and the second communication period:
    generating any one of the first and the second measurement request message requesting any one of the first and the second group of communication terminal devices using the short range communication operation;
    receiving results of measurement in accordance with the generated any one of the first and the second measurement request message;
    allocating a second schedule of a spatial sharing based on the results of measurement; and
    transmitting any one of the first and the second measurement request message to any one of the first and the second group of communication terminal devices using the short range communication operation and the second schedule of the spatial sharing to the first group of communication terminal devices and the second group of communication terminal devices; and
  in response to determining that the short range communication operation is performed in both the first communication period and the second communication period:

allocating a third schedule of the spatial sharing based on the determined communication operations in the first and second communication periods; and transmitting the third schedule of the spatial sharing to the first group of communication terminal devices and the second group of communication terminal devices.

* * * * *